US008147366B2

(12) United States Patent
Kawasaki et al.

(10) Patent No.: US 8,147,366 B2
(45) Date of Patent: Apr. 3, 2012

(54) POWER OUTPUT APPARATUS AND VEHICLE

(75) Inventors: Koji Kawasaki, Anjo (JP); Mitsuo Inagaki, Okazaki (JP)

(73) Assignees: Toyota Jidosha Kabushiki Kaisha, Toyota (JP); Nippon Soken, Inc., Nishio-shi (JP)

( * ) Notice: Subject to any disclaimer, the term of this patent is extended or adjusted under 35 U.S.C. 154(b) by 465 days.

(21) Appl. No.: 12/385,248

(22) Filed: Apr. 2, 2009

(65) Prior Publication Data
US 2009/0250278 A1 Oct. 8, 2009

(30) Foreign Application Priority Data

Apr. 7, 2008 (JP) .................................. 2008-099531

(51) Int. Cl.
*F16H 3/72* (2006.01)
*B60W 10/00* (2006.01)

(52) U.S. Cl. ............ 475/5; 475/211; 180/65.265; 477/3

(58) Field of Classification Search .. 180/65.21–65.285; 477/2–9; 475/3, 5, 209–212, 218, 311
See application file for complete search history.

(56) References Cited

U.S. PATENT DOCUMENTS

| 5,073,157 | A | | 12/1991 | Herscovici | |
|---|---|---|---|---|---|
| 5,935,035 | A | * | 8/1999 | Schmidt | 475/5 |
| 6,344,008 | B1 | * | 2/2002 | Nagano et al. | 475/1 |
| 6,461,261 | B2 | * | 10/2002 | Yamamoto et al. | 474/8 |
| 6,821,228 | B2 | * | 11/2004 | Aoki et al. | 477/44 |
| 6,823,250 | B2 | * | 11/2004 | Yamaguchi et al. | 701/51 |
| 7,174,979 | B2 | * | 2/2007 | Ohta et al. | 180/65.25 |
| 7,562,730 | B2 | * | 7/2009 | Shimizu et al. | 180/65.23 |
| 7,568,996 | B2 | * | 8/2009 | Matsui et al. | 477/46 |
| 7,572,201 | B2 | * | 8/2009 | Supina et al. | 475/5 |
| 7,575,078 | B2 | * | 8/2009 | Muta et al. | 180/65.265 |
| 7,637,836 | B2 | * | 12/2009 | Watanabe et al. | 475/210 |
| 7,695,387 | B2 | * | 4/2010 | Oba | 475/5 |
| 7,819,212 | B2 | * | 10/2010 | Kawasaki | 180/65.265 |
| 7,836,986 | B1 | * | 11/2010 | Gillecriosd | 180/65.21 |
| 8,033,939 | B2 | * | 10/2011 | Tabata et al. | 475/5 |
| 8,047,314 | B2 | * | 11/2011 | Oba et al. | 180/65.265 |
| 8,060,288 | B2 | * | 11/2011 | Choby | 701/70 |
| 2004/0168841 | A1 | * | 9/2004 | Ohta et al. | 180/65.2 |
| 2007/0093341 | A1 | * | 4/2007 | Supina et al. | 475/5 |
| 2007/0129214 | A1 | * | 6/2007 | Kondo et al. | 477/144 |
| 2008/0015760 | A1 | * | 1/2008 | Yamauchi | 701/67 |

(Continued)

FOREIGN PATENT DOCUMENTS

JP A-9-46821 2/1997

(Continued)

*Primary Examiner* — J. Allen Shriver, II
*Assistant Examiner* — Jacob Meyer
(74) *Attorney, Agent, or Firm* — Oliff & Berridge, PLC

(57) ABSTRACT

The hybrid vehicle includes the engine capable of outputting power to the drive gear; the motors MG1 and MG2; the CVT; the planetary gear mechanism having the sun gear connected to the secondary shaft of the CVT, the ring gear capable of rotating in the direction opposite to the rotational direction of drive gear in conjunction with the drive gear, and the carrier connected the carrier shaft as the drive shaft; the clutch C1 that performs a connection and releases the connection between the primary shaft of the CVT and the motor MG1; the clutch C2 that performs a connection and releases the connection between the motor MG1 and the drive gear; and the brake B1 capable of non-rotatably fixing the sun gear of the planetary gear mechanism.

12 Claims, 13 Drawing Sheets

U.S. PATENT DOCUMENTS

| | | | |
|---|---|---|---|
| 2008/0053723 A1* | 3/2008 | Kozarekar | 180/65.2 |
| 2008/0083292 A1* | 4/2008 | Muta et al. | 74/336 R |
| 2008/0312021 A1* | 12/2008 | Oba | 475/5 |
| 2009/0043468 A1* | 2/2009 | Kondo et al. | 701/61 |
| 2009/0200095 A1* | 8/2009 | Kawasaki | 180/65.265 |
| 2009/0203495 A1* | 8/2009 | Muta et al. | 477/3 |
| 2010/0032217 A1* | 2/2010 | Katsuta et al. | 180/65.23 |

FOREIGN PATENT DOCUMENTS

| | | |
|---|---|---|
| JP | A-2002-39320 | 2/2002 |
| JP | A-2002-139136 | 5/2002 |
| JP | A-2004-175320 | 6/2004 |

* cited by examiner

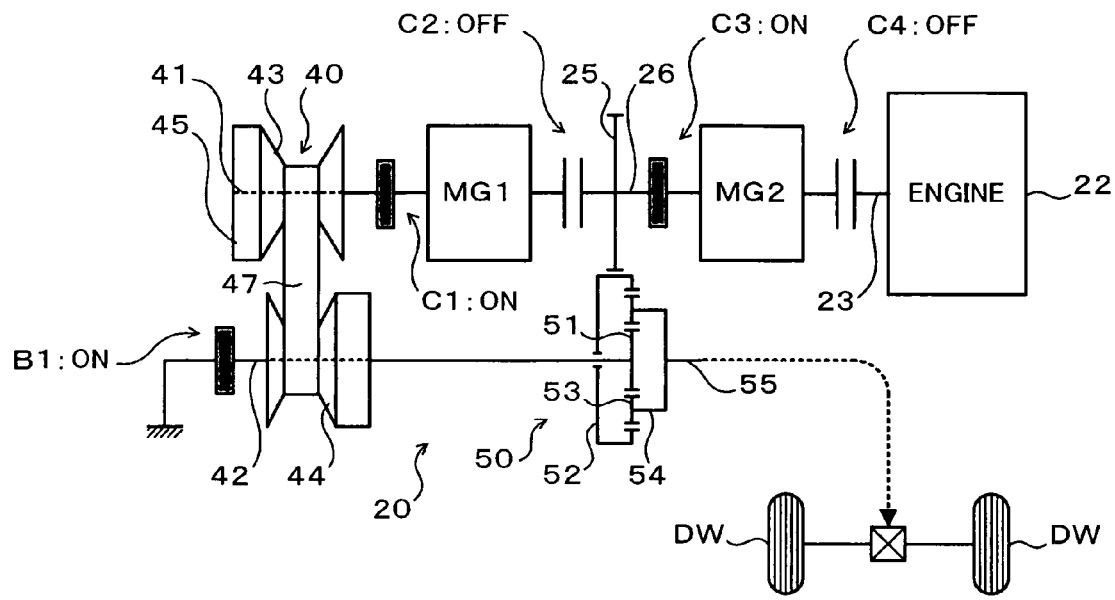
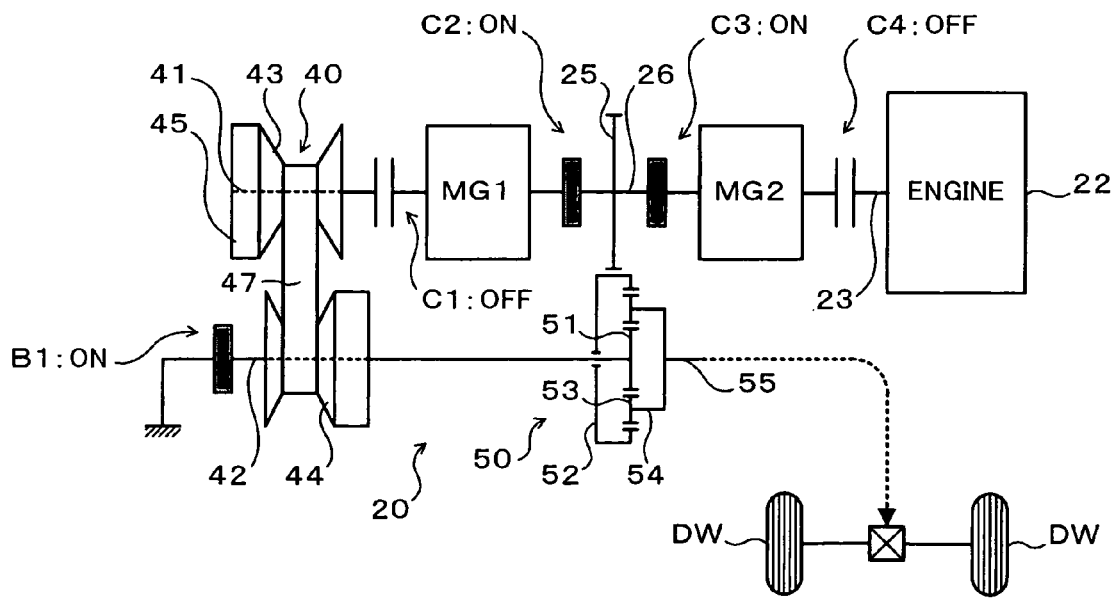

POWER OUTPUT APPARATUS AND VEHICLE

BACKGROUND OF THE INVENTION

1. Field of the Invention

The present invention relates to a power output apparatus for outputting power to a drive shaft and a vehicle including drive wheels connected to a driveshaft.

2. Description of the Prior Art

Japanese Patent Laid-open No. 2004-175320 discloses a power output apparatus including an infinitely variable transmission (IVT) constituted by a combination of a continuously variable transmission and a planetary gear mechanism, and used as a hybrid vehicle driving apparatus. The power output apparatus includes a motor, a continuously variable transmission, a planetary gear mechanism including a sun gear as a first input element, a carrier as a second input element, and a ring gear as an output element, a high clutch that engages and disengages the sun gear of the planetary gear mechanism with and from an output shaft of the apparatus, and a low clutch that engages and disengages the ring gear of the planetary gear mechanism with and from the output shaft of the apparatus. An input shaft of the continuously variable transmission is connected to an engine and connected to the carrier of the planetary gear mechanism via a parallel gear train. An output shaft of the continuously variable transmission is connected to the sun gear of the planetary gear mechanism and the motor.

In the power output apparatus, a torque circulation mode is set in which the high clutch is disengaged and the low clutch is engaged to cause torque circulation in the continuously variable transmission. In the torque circulation mode, a change speed state of the continuously variable transmission is changed from an acceleration state to a deceleration state to change the sun gear from a high speed (over drive) rotation state at an input speed ratio Ai to a low speed (under drive) rotation speed at an input speed ratio Bi, thereby allowing a speed ratio of the ring gear connected to the output shaft of the apparatus to be changed from a negative speed ratio Ao (reverse state) to a certain speed increasing ratio Bo. In the torque circulation mode, torque from the motor is amplified by the continuously variable transmission, and thus the output shaft can output high torque and a rotation speed of the motor becomes higher than a rotation speed of the output shaft of the apparatus, thereby allowing energy regeneration by the motor in a rotation region with high regenerative efficiency. Further, the power output apparatus disengages the low clutch and engages the high clutch at the time of synchronous rotation between the sun gear and the ring gear to set a direct torque transmission mode. In the direct torque transmission mode, the change speed state of the continuously variable transmission can be changed from a constant speed state to the acceleration state to change a speed ratio of the sun gear as the output element, that is, the output shaft of the apparatus from a constant speed ratio Ci to a high speed ratio Di. In the direct torque transmission mode, torque from the motor can be transmitted to the output shaft without via the continuously variable transmission, thereby allowing transmission efficiency of the motor torque to be increased, and allowing energy regeneration by the motor without a loss in the continuously variable transmission.

In the above described power output apparatus, the torque circulation mode is set to allow high torque to be efficiently outputted to the output shaft in a low speed region. However, in the direct torque transmission mode, only at least one of power from the engine that is changed in speed by the continuously variable transmission and power from the motor can be outputted to the output shaft. Thus, in terms of increasing a speed ratio range to increase energy efficiency and torque characteristic in a broad operation region from a low speed region to a high speed region, there is still need for improvement in the conventional power output apparatus.

SUMMARY OF THE INVENTION

The present invention has a main object to provide a power output apparatus that can increase energy efficiency and torque characteristic in a broader operation region, and a vehicle including the power output apparatus.

In order to achieve the above main object, the power output apparatus and the vehicle in accordance with the present invention adopt the following means.

The present invention is directed to a power output apparatus that outputs power to a drive shaft. The power output apparatus includes: a power generation source capable of outputting power to a predetermined rotational element; an electric motor capable of outputting power; an accumulator capable of supplying and receiving electric power to and from the electric motor; a continuously variable transmission device capable of steplessly changing the speed of power inputted to an input shaft and outputting the power to an output shaft; a planetary gear mechanism that includes: a first input element connected to the output shaft of the continuously variable transmission device; a second input element rotatable in a direction opposite to a rotational direction of the rotational element in conjunction with the rotational element; and an output element connected to the drive shaft; a first connection and disconnection device that performs a connection and releases the connection between the input shaft of the continuously variable transmission device and a rotating shaft of the electric motor; a second connection and disconnection device that performs a connection and releases the connection between the rotating shaft of the electric motor and the rotational element; and an element fixing device capable of non-rotatably fixing the first input element of the planetary gear mechanism.

According to the power output apparatus, when the first and second connection and disconnection devices connect the input shaft of the continuously variable transmission device, the rotating shaft of the electric motor, and the rotational element, the rotational element, the continuously variable transmission device, and the planetary gear mechanism operate in cooperation with each other to constitute a so-called infinitely variable transmission (IVT), cause a torque circulation by splitting power from at least one of the power generation source and the electric motor from the rotational element and the continuously variable transmission device to be outputted to the planetary gear mechanism, thereby allowing the speed ratio between the rotational element and the output element (drive shaft) of the planetary gear mechanism to be set to theoretically infinite. Specifically, the power output apparatus uses the continuously variable transmission device to set the speed ratio between the rotational element and the output element of the planetary gear mechanism to substantially infinite. Therefore, even if the power generation source and the like connected to the rotational element is operated, for example, at any rotation speed capable of increasing efficiency, the rotation of the output element and the drive shaft can be stopped. In a state where the above speed ratio is substantially infinite, when the change speed state of the continuously variable transmission device is changed, the output element and the drive shaft can be rotated forwardly or reversely. Particularly, when the rotation speed of the drive shaft is low, torque from at least one of the power generation source and the electric motor can be amplified and high torque can be efficiently outputted to the drive shaft. Further, in a state where the first connection and disconnection device connects the input shaft of the continuously variable transmission device and the rotating shaft of the electric motor, when the second connection and disconnection device releases the connection between rotating shaft of the electric motor and the rotational element, the electric motor can rotate the input shaft of the continuously variable transmission device independently of the rotation of the rotational element. In this state, the rotation of the electric motor connected to the input shaft of the continuously variable transmission device is controlled, and further, the change speed state of the continuously variable transmission device is changed as needed. By doing so, the speed ratio between the rotational element, namely, the power generation source and the electric motor and the output element (drive shaft) of the planetary gear mechanism can be further decreased (larger speed increasing ratio). Further, in a state where the first connection and disconnection device connects the input shaft of the continuously variable transmission device and the rotating shaft of the electric motor, and the second connection and disconnection device releases the connection between the rotating shaft of the electric motor and the rotational element, when the electric motor is decelerated and the rotation of the output shaft of the continuously variable transmission device is stopped, the element fixing device can non-rotatably fix the first input element of the planetary gear mechanism. In a state where the first input element of the planetary gear mechanism is non-rotatably fixed, the power from the power generation source can be transmitted to the drive shaft via the rotational element and the planetary gear mechanism without using the continuously variable transmission device. Further, in the state where the first input element of the planetary gear mechanism is non-rotatably fixed, when the second connection and disconnection device connects the rotating shaft of the electric motor and the rotational element, the power from both the power generation source and the electric motor can be transmitted to the drive shaft via the rotational element and the planetary gear mechanism. Thereby, the power from the power generation source and the electric motor can be efficiently transmitted to the drive shaft without a loss in the continuously variable transmission device, and the performance of the power output apparatus can be further improved. As a result, the power output apparatus can further increase the speed ratio range between the power generation source and the electric motor, and the drive shaft, and can improve the energy efficiency and the torque characteristics in an extremely wide driving area ranging from a low speed area in which the rotation speed of the drive shaft is low to a high speed area in which the rotation speed thereof is increased.

The drive shaft may rotate forwardly when the output element of the planetary gear mechanism rotates in the direction opposite to the rotational direction of the rotational element. In this configuration, when the drive shaft rotates forwardly, both the second input element of the planetary gear mechanism and the output element rotate in the direction opposite to the rotational direction of the above rotational element. Accordingly, in this case, in a state where the speed ratio between the rotational element and the output element of the planetary gear mechanism is set to substantially infinite, when the change speed state of the continuously variable transmission device is changed to the acceleration side, the rotation speed of the first input element of the planetary gear mechanism connected to the output shaft of the continuously variable transmission device increases. Thereby, high torque can be outputted to the output element of the planetary gear mechanism to rotate the output element in the same direction as the rotational direction of the rotational element, that is, high torque can be outputted to the drive shaft to reversely rotate the drive shaft. Alternatively, in a state where the speed ratio between the rotational element and the output element of the planetary gear mechanism is set to substantially infinite, when the change speed state of the continuously variable transmission device is changed to the deceleration side, the rotation speed of the first input element of the planetary gear mechanism connected to the output shaft of the continuously variable transmission device decreases. Thereby, high torque can be outputted to the output element of the planetary gear mechanism and the output element can be rotated in the direction opposite to the rotational direction of the rotational element to increase the rotation speed, that is, high torque can be outputted to the drive shaft, and the drive shaft can be rotated to the forward rotation side to increase the rotation speed. Further, in a state where the second connection and disconnection device releases the connection between the rotating shaft of the electric motor and the rotational element, when the rotation speed of the electric motor connected to the input shaft of the continuously variable transmission device by the first connection and disconnection device decreases, and the electric motor is temporarily stopped, the rotation speed of the first input element of the planetary gear mechanism connected to the output shaft of the continuously variable transmission device can be set a value of 0. In this state, when the element fixing device non-rotatably fixes the first input element of the planetary gear mechanism, the power from the power generation source can be transmitted to the drive shaft via the rotational element and the planetary gear mechanism. Further, in a state where the first input element of the planetary gear mechanism is non-rotatably fixed, when the second connection and disconnection device connects the rotating shaft of the electric motor and the rotational element, the power from both the power generation source and the electric motor can be transmitted to the drive shaft via the rotational element and the planetary gear mechanism. Further, in a state where the second connection and disconnection device releases the connection between the rotating shaft of the electric motor and the rotational element, when the rotation speed of the electric motor connected to the input shaft of the continuously variable transmission device by the first connection and disconnection device reaches a value of 0, if the rotation speed of the electric motor is increased in the direction opposite to the rotational direction thereof, the first input element of the planetary gear mechanism connected to the output shaft of the continuously variable transmission device can be rotated in the direction opposite to the rotational direction of the above rotational element, that is, in the same direction as the rotational direction of the second input element and the output element, and the rotation speed thereof can be increased. At this time, if the change speed state of the continuously variable transmission device is changed to the acceleration side, the rotation speed of the first input element can be further increased. The further increased the rotation speed of the first input element of the planetary gear mechanism in the direction opposite to the rotational direction of the above rotational element, the further decreased (larger speed increasing ratio) the speed ratio between the rotational element and the output element (drive shaft) of the planetary gear mechanism, and the rotation speed in the forward rotation side of the drive shaft can be further increased. As described above, when the output element of the planetary gear mechanism rotates in the direction opposite to the rotational direction of the above rotational element, the drive shaft rotates forwardly. In this state, continuously changing the rotation speed of the first input element within the range including a value of 0 can prevent an excessive rotation speed of the individual elements (especially, the first input element) of the planetary gear mechanism, and enables forward rotation and reverse rotation of the drive shaft. Further, the speed ratio range between the power generation source and the electric motor, and the drive shaft can be increased to improve the energy efficiency and the torque characteristics in a wide driving area in the forward rotation side of the drive shaft.

The power output apparatus may further include a control module that controls at least one of the power generation source and the electric motor so that power based on driving power demand required for the drive shaft is outputted to the drive shaft when the first connection and disconnection device releases a connection between the input shaft of the continuously variable transmission device and the rotating shaft of the electric motor, the second connection and disconnection device connects the rotating shaft of the electric motor and the rotational element, and the element fixing device non-rotatably fixes said first input element of the planetary gear mechanism.

The control module may control the power generation source so that the power based on the driving power demand is outputted to the drive shaft when the second connection and disconnection device releases the connection between the rotating shaft of the electric motor and the rotational element, and the element fixing device non-rotatably fixes the first input element of the planetary gear mechanism.

The control module may control the power generation source, the electric motor, and the continuously variable transmission device so that the power based on the driving power demand is outputted to the drive shaft when the first and second connection and disconnection devices connect the input shaft of the continuously variable transmission device, the rotating shaft of the electric motor, and the rotational element, as well as the control module may control the power generation source, the electric motor, and the continuously variable transmission device so that the electric motor decelerates or the electric motor rotates in the direction opposite to the rotational direction of the rotational element, and the power based on the driving power demand is outputted to the drive shaft, when the first connection and disconnection device connects the rotating shaft of the electric motor and the input shaft of the continuously variable transmission device, and the second connection and disconnection device releases the connection between the rotating shaft of the electric motor and the rotational element.

The power output apparatus may further include a third connection and disconnection device that performs a connection and releases the connection between the rotational element and the power generation source. Thereby, in a state where the first and second connection and disconnection devices connect the rotational element and the input shaft of the continuously variable transmission device, and the rotating shaft of the electric motor, as well as the third connection and disconnection device releases the connection between the rotational element and the power generation source, the power only from the electric motor can be transmitted to the drive shaft by splitting from the rotational element and the continuously variable transmission device to be outputted to the planetary gear mechanism. Further, in a state where the first connection and disconnection device releases the connection between the input shaft of the continuously variable transmission device and the rotating shaft of the electric motor, the second connection and disconnection device connects the rotating shaft of the electric motor and the rotational element, the element fixing device non-rotatably fixes the first input element of the planetary gear mechanism, and the third connection and disconnection device releases the connection between the rotational element and the power generation source, the power only from the electric motor can be transmitted to the drive shaft via the rotational element and the planetary gear mechanism.

The control module may control the electric motor and the continuously variable transmission device so that the power based on the driving power demand is outputted to the drive shaft when the first and second connection and disconnection devices connect the input shaft of the continuously variable transmission device, the rotating shaft of the electric motor, and the rotational element, and the third connection and disconnection device releases the connection between the rotational element and the power generation source, as well as the control module may control the electric motor so that the power based on the driving power demand is outputted to the drive shaft when the first connection and disconnection device releases the connection between the rotating shaft of the electric motor and the input shaft of the continuosly variable transmission device, the second connection and disconnection device connects the rotating shaft of the electric motor and the rotational element, the element fixing device non-rotatably fixes the first input element of the planetary gear mechanism, and the third connection and disconnection device releases the connection between the rotational element and the power generation source.

The power generation source may be a second electric motor different from the electric motor. Specifically, the power output apparatus according to the present invention may be configured as a so-called 2-motor power output apparatus.

The power generation source may be an internal combustion engine. Specifically, the power output apparatus according to the present invention may be configured as a so-called 1-motor 1-engine power output apparatus including a combination of an internal combustion engine and single electric motor.

The power generation source may include a second electric motor different from the electric motor, and an internal combustion engine. Specifically, the power output apparatus in accordance with the present invention may be configured as a so-called 2-motor 1-engine type power output apparatus.

The above described power output apparatus which includes the internal combustion engine and the second motor as the power generation source may further include a fourth connection and disconnection device that performs a connection and releases the connection between the second electric motor and the internal combustion engine. This allows the fourth connection and disconnection device to release the connection between the second electric motor and the internal combustion engine. Thus, when the internal combustion engine stops operating, the corotation of the internal combustion engine can be avoided.

The present invention is directed to a vehicle having drive wheels connected to a drive shaft. The vehicle includes: a power generation source capable of outputting power to a predetermined rotational element; an electric motor capable of outputting power; an accumulator capable of supplying and receiving electric power to and from the electric motor; a continuously variable transmission device capable of steplessly changing the speed of power inputted to an input shaft and outputting the power to an output shaft; a planetary gear mechanism that includes: a first input element connected to the output shaft of the continuously variable transmission device; a second input element rotatable in a direction opposite to a rotational direction of the rotational element in conjunction with the rotational element; and an output element connected to the drive shaft; a first connection and disconnection device that performs a connection and releases the connection between the input shaft of the continuously variable transmission device and a rotating shaft of the electric motor; a second connection and disconnection device that performs a connection and releases the connection between the rotating shaft of the electric motor and the rotational element; and an element fixing device capable of non-rotatably fixing the first input element of the planetary gear mechanism.

The vehicle can further increase the speed ratio range between the power generation source and the electric motor, and the drive shaft, and can improve the energy efficiency and the torque characteristics in an extremely wide driving area ranging from a low speed area in which the rotation speed of the drive shaft is low to a high speed area in which the rotation speed thereof is increased.

BRIEF DESCRIPTION OF THE DRAWINGS

FIG. 15 illustrates a motor driving mode of the hybrid vehicle of the embodiment;

FIG. 16 illustrates a motor driving mode of the hybrid vehicle of the embodiment;

DESCRIPTION OF THE PREFERRED EMBODIMENTS

Hereinafter, the best mode for carrying out the invention will be described with reference to embodiments.

Figure 1:
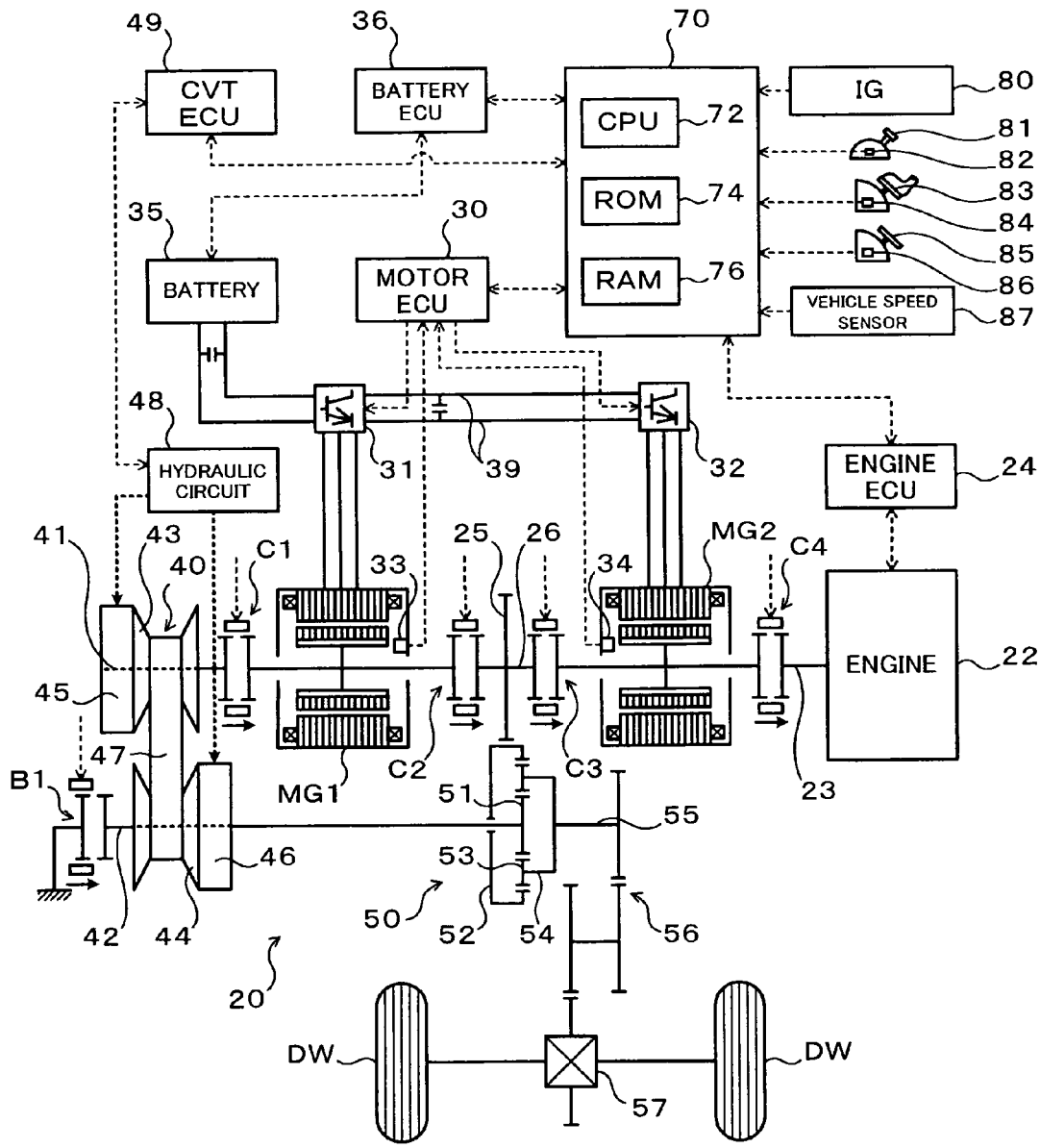
FIG. 1 is a schematic block diagram of a hybrid vehicle according to an embodiment of the present invention.

FIG. 1 is a schematic block diagram of a hybrid vehicle 20 which is a vehicle according to an embodiment of the present invention. The hybrid vehicle 20 shown in the same figure includes: an engine 22; two motors MG1 and MG2; a battery 35 that can supply and receive electric power to and from the motors MG1 and MG2; a drive gear (rotational element) 25, a belt-type continuously variable transmission unit (hereinafter referred to as "CVT") 40, and a three-element planetary gear mechanism 50 which constitute a so-called infinitely variable transmission; and a hybrid electronic control unit (hereinafter referred to as "hybrid ECU") 70 which controls the entire hybrid vehicle 20.

The engine 22 is an internal combustion engine that receives a supply of hydrocarbon fuel such as gasoline or gas oil and basically rotates in one direction to output power, and is controlled in fuel injection amount, ignition timing, intake air amount, or the like by an engine electronic control unit (hereinafter referred to as "engine ECU") 24. To the engine ECU 24, signals from various sensors, such as an unshown crank position sensor mounted to a crankshaft 23, which are provided in the engine 22 and detect an operation state of the engine 22 are inputted. The engine ECU 24 communicates with the hybrid ECU 70, controls the operation of the engine 22 on the basis of control signals from the hybrid ECU 70 and the signals from the sensors, and outputs data on the operation state of the engine 22 to the hybrid ECU 70 as required.

Each of the motor MG1 and the motor MG2 having the same specifications in the present embodiment is configured as a synchronous motor generator which can operate not only as a generator, but also as an electric motor; and supplies and receives electric power to and from the battery 35 which is a secondary battery via inverters 31 and 32. Power lines 39 connecting the inverters 31 and 32 and the battery 35 are configured as a positive electrode bus line and a negative electrode bus line shared by the individual inverters 31 and 32; and are configured such that power generated by one of the motors MG1 and MG2 can be consumed by the other motor. Therefore, the battery 35 is charged or discharged according to electric power consumed or generated by at least one of the motors MG1 and MG2. If the electric power consumption and generation is balanced between the motors MG1 and MG2, the battery 35 is assumed to be neither charged nor discharged. Both the motors MG1 and MG2 are driven and controlled by a motor electronic control unit (hereinafter referred to as "motor ECU") 30. The motor ECU 30 receives signals required for driving and controlling the motors MG1 and MG2, such as signals from rotational position detection sensors 33 and 34 which detect a rotational position of a rotor of motors MG1 and MG2; and a phase current which is detected by a current sensor (not shown) and is applied to the motors MG1 and MG2. The motor ECU 30 outputs signals such as a switching control signal to the inverters 31 and 32. The motor ECU 30 uses the signals inputted from the rotational position detection sensors 33 and 34 to execute a rotation speed calculation routine (not shown) for calculating the rotation speeds Nm1 and Nm2 of the rotors of the motors MG1 and MG2. Further, the motor ECU 30 communicates with the hybrid ECU 70, drives and controls the motors MG1 and MG2 in response to the control signals from the hybrid ECU 70, and outputs data about the operating states of the motors MG1 and MG2 to the hybrid ECU 70 as needed.

The battery 35 in the present embodiment is configured as a nickel-metal-hydride secondary battery or a lithium ion secondary battery; and is controlled by a battery electronic control unit (hereinafter referred to as "battery ECU") 36. To the battery ECU 36, signals required for controlling the battery 35, for example, an inter-terminal voltage from an unshown voltage sensor provided between terminals of the battery 35, charge and discharge currents from an unshown current sensor mounted to a power line 39 connected to an output terminal of the battery 35, and a battery temperature Tb from an unshown temperature sensor mounted to the battery 35 are inputted. The battery ECU 36 outputs data on a state of the battery 35 to the hybrid ECU 70 and the engine ECU 24 by communication as required. Further, for controlling the battery 35, the battery ECU 36 in the embodiment calculates a state of charge SOC on the basis of an integrated value of the charge and discharge currents detected by the current sensor, calculates a charge and discharge power demand Pb* of the battery 35 on the basis of the state of charge SOC, or calculates an input limit Win as a charge allowable electric power that is electric power allowed for charge of the battery 35 and an output limit Wout as a discharge allowable electric power that is electric power allowed for discharge of the battery 35 on the basis of the state of charge SOC and the battery Temperature Tb. The input and output limits Win and Wout of the battery 35 can be set by setting basic values of the input and output limits Win and Wout on the basis of the battery temperature Tb, setting an output limit correction coefficient and an input limit correction coefficient on the basis of the state of charge (SOC) of the battery 35, and multiplying the basic values of the input and output limits Win and Wout by the correction coefficients.

The CVT 40 includes a primary shaft 41 as a drive side rotating shaft (input shaft), a secondary shaft 42 as a driven side rotating shaft (output shaft) extending in parallel with the primary shaft 41 and connected to the planetary gear mechanism 50, a primary pulley 43 provided on the primary shaft 41, a secondary pulley 44 provided on the secondary shaft 42, and a belt 47 wound around the primary pulley 43 and the secondary pulley 44. The primary pulley 43 includes a stationary sheave integrally formed with the primary shaft 41 and a movable sheave supported by the primary shaft 41 axially slidably via a ball spline or the like. At the rear of the movable sheave of the primary pulley 43, a hydraulic cylinder (hydraulic actuator) 45 for changing a groove width of the primary pulley 43 is formed. The secondary pulley 44 includes a stationary sheave integrally formed with the secondary shaft 42, and a movable sheave supported by the secondary shaft 42 axially slidably via a ball spline, a return spring, or the like. At the rear of the movable sheave of the secondary pulley 44, a hydraulic cylinder (hydraulic actuator) 46 for changing a groove width of the secondary pulley 44 is formed. Further, in the CVT 40 in the embodiment, an unshown cancel plate that defines a cancel chamber at the rear of the hydraulic cylinder 46 is provided on the secondary pulley 44. A working fluid can be introduced into the cancel chamber defined by the cancel plate and the like, and thus centrifugal hydraulic pressure applied to the working fluid in the cancel chamber can cancel centrifugal hydraulic pressure applied to the hydraulic cylinder 46. To the hydraulic cylinder 45 on the side of the primary pulley 43, and the hydraulic cylinder 46 and the cancel chamber on the side of the secondary pulley 44, the working fluid increased in pressure by an unshown motor oil pump is adjusted in pressure by a hydraulic circuit 48 including a plurality of control valves and supplied, and thus the groove widths of the primary pulley 43 and the secondary pulley 44 can be changed to output power inputted to the primary shaft 41 to the secondary shaft 42 while steplessly changing the speed of the power. The hydraulic circuit 48 can be controlled by a CVT electronic control unit (hereinafter referred to as "CVTECU") 49. The CVTECU 49 communicates with the hybrid ECU 70, receives a rotation speed Ni of the primary shaft 41 and a rotation speed No of the secondary shaft 42 detected by an unshown rotational position detection sensor, and generates and outputs drive signals to the hydraulic circuit 48 on the basis of the control signals from the hybrid ECU 70 and the rotation speeds Ni and No so that a speed ratio γ of the CVT 40 is set to a target value. The CVTECU 49 outputs data on the CVT 40 to the hybrid ECU 70 as required. The CVT 40 is not exclusively driven by the hydraulic circuit 48, but may be driven by an actuator other than the hydraulic circuit 48 such as a motor-driven actuator.

The planetary gear mechanism 50 includes a sun gear (first input element) 51 which is an external gear; a ring gear (second input element) 52 which is an internal gear and is arranged concentrically with the sun gear 51; a plurality of pinion gears 53 which mesh with the sun gear 51 and the ring gear 52; and a carrier (output element) 54 which rotatably and revolvably holds the plurality of pinion gears 53. The planetary gear mechanism 50 is configured to use the sun gear 51, the ring gear 52, and the carrier 54 as the rotational elements to perform a differential operation. The sun gear 51 which is the first input element of the planetary gear mechanism 50 connects to a secondary shaft 42 of the above described CVT 40. According to the present embodiment, the same number (same module) of external teeth as that of the external teeth of the drive gear 25 are formed on an outer periphery of the ring gear 52 which is the second input element of the planetary gear mechanism 50, and the external teeth of the ring gear 52 mesh with the drive gear 25 which is an external gear. This allows the ring gear 52 to rotate in unison with the drive gear 25 but in the direction opposite to the rotational direction of the drive gear 25. Further, the carrier 54 which is the output element of the planetary gear mechanism 50 connects to a carrier shaft 55 serving as the drive shaft. The power outputted to the carrier shaft 55 is finally outputted to the left and right wheels DW, which are drive wheels, via the gear train 56 and the differential gear 57 from the carrier shaft 55. It should be noted that the ring gear 52 may be coupled to the drive gear 25 via a gear train including a plurality of gears or a belt.

As shown in FIG. 1, the primary shaft 41 of the CVT 40 connects to one end (left in the Figure) of a rotating shaft fixed to a rotor of the motor MG1 via the clutch C1. The drive gear 25 constituting the infinitely variable transmission together with the CVT 40 and the planetary gear mechanism 50 is fixed to the drive gear shaft 26, facing the CVT 40 with the motor MG1 therebetween as well as the engine 22 with the motor MG2 therebetween. Further, one end (left in the Figure) of the drive gear shaft 26 connects to the other end (right in the Figure) of the rotating shaft fixed to the rotor of the motor MG1 via the clutch C2, and the other end (right in the Figure) of the drive gear shaft 26 connects to one end (left in the Figure) of a rotating shaft fixed to a rotor of the motor MG2 via the clutch C3. The other end (right in the Figure) of the rotating shaft fixed to the rotor of the motor MG2 connects to a crankshaft 23 of the engine 22 via the clutch C4 and a damper (not shown).

The clutch C1 of the present embodiment is configured as a dog clutch including a movable engaging member which can engage with both an engaging part provided at an end portion (right in the Figure) of the primary shaft 41 and an engaging part provided at one end (left in the Figure) of the rotating shaft fixed to the rotor of the motor MG1, and can be moved back and forth in an axial direction of the drive gear shaft 26 and the primary shaft 41 by an electromagnetic, electric, or hydraulic actuator (not shown). Therefore, when the clutch C1 is engaged, a connection can be made between the primary shaft 41 of the CVT 40 and the rotating shaft of the motor MG1. When the clutch C1 is disengaged, the connection between the primary shaft 41 and the rotating shaft of the motor MG1 can be released. Moreover, the clutch C2 of the present embodiment is configured as a dog clutch including a movable engaging member which can engage with both the engaging part provided at the other end (right in the Figure) of the rotating shaft fixed to the rotor of the motor MG1 and the engaging part provided at one end (left in the Figure) of the drive gear shaft 26, and can be moved back and forth in an axial direction of the drive gear shaft 26 and the like by an electromagnetic, electric, or hydraulic actuator (not shown). Therefore, when the clutch C2 is engaged, a connection can be made between the rotating shaft of the motor MG1 and the drive gear shaft 26 (drive gear 25); and when the clutch C2 is disengaged, the connection between the rotating shaft of the motor MG1 and the drive gear shaft 26 can be released. Further, the clutch C3 of the present embodiment is configured as a dog clutch including a movable engaging member which can engage with both the engaging part provided at the other end (right in the Figure) of the drive gear shaft 26 and the engaging part provided at one end (left in the Figure) of the rotating shaft fixed to the rotor of the motor MG2, and can be moved back and forth in an axial direction of the drive gear shaft 26 and the like by an electromagnetic, electric, or hydraulic actuator (not shown). Therefore, when the clutch C3 is engaged, a connection can be made between the drive gear shaft 26 (drive gear 25) and the rotating shaft of the motor MG2; and when the clutch C3 is disengaged, the connection between the drive gear shaft 26 and the rotating shaft of the motor MG2 can be released. Moreover, the clutch C4 of the present embodiment is configured as a dog clutch including a movable engaging member which can engage with both the engaging part provided at the other end (right in the Figure) of the rotating shaft fixed to the rotor of the motor MG2 and the engaging part provided at one end (left in the Figure) of a shaft fixed to the damper, and can be moved back and forth in an axial direction of the crankshaft 23 and the like by an electromagnetic, electric, or hydraulic actuator (not shown). Therefore, when the clutch C4 is engaged, a connection can be made between the rotating shaft of the motor MG2 and the crankshaft 23 of the engine 22; and when the clutch C4 is disengaged, the connection between the rotating shaft of the motor MG2 and the crankshaft 23 can be released.

In addition to the clutches C1 to C4, the hybrid vehicle 20 of the present embodiment also includes a brake B1 for non-rotatably fixing the sun gear 51 which is the first input element of the planetary gear mechanism 50 via the secondary shaft 42 of the CVT 40. According to the present embodiment, the brake B1 is configured as a dog clutch including a movable engaging member which can engage with both an engaging part provided at one end (left in the Figure) of the secondary shaft 42 of the CVT 40 and an engaging part fixed to a transmission case (not shown), and can be moved back and forth in an axial direction of the secondary shaft 42 by an electromagnetic, electric, or hydraulic actuator (not shown). When the brake B1 is applied to engage the movable engaging member with both the engaging part of the secondary shaft 42 and the engaging part of the transmission case side, the secondary shaft 42 and the sun gear 51 can be non-rotatably fixed and the CVT 40 can be locked. As described above, the clutches C1 to C4 and the brake B1 are configured as the dog clutches, and thus members to be connected or disconnected can be connected to or disconnected from each other with lower loss. It is obvious that the clutches C1 to C4 and the brake B1 may be configured as general friction clutches such as hydraulically driven multi-plate clutches or a brake.

The hybrid ECU 70 is configured as a microprocessor mainly including a CPU 72, a ROM 74 that stores a processing program, a RAM 76 that temporarily stores data, and unshown input and output ports and communication ports. To the hybrid ECU 70, an ignition signal from an ignition switch (start switch) 80, a shift position SP from a shift position sensor 82 that detects a shift position SP that is an operation position of a shift lever 81, an accelerator opening Acc from an accelerator pedal position sensor 84 that detects a depression amount of an accelerator pedal 83, a brake pedal stroke BS from a brake pedal stroke sensor 86 that detects a depression amount (stroke) of a brake pedal 85, and a vehicle speed V from a vehicle speed sensor 87 are inputted via an input port. As described above, the hybrid ECU 70 is connected to the engine ECU 24, the motor ECU 30, the battery ECU 36, and the CVTECU 49 via the communication ports, and transmits and receives various control signals and data to and from the engine ECU 24, the motor ECU 30, the battery ECU 36, and the CVTECU 49. Unshown actuators of the clutches C1 to C4 and the brake B1 are also controlled by the hybrid ECU 70.

Now, with reference to FIG. 2, a description will be given to the procedure of setting an infinite speed ratio using the drive gear 25, the CVT 40 and the planetary gear mechanism 50 operating as the infinitely variable transmission. Here, with reference to FIG. 2, a 25-axis represents a rotation speed Nd of the drive gear 25 and the drive gear shaft 26 equal to a rotation speed Ne of the engine 22 and a rotation speed Nm2 of the motor MG2; a 41-axis represents a rotation speed Ni of the primary shaft 41 of the CVT 40 equal to a rotation speed Nm1 of the motor MG1; an R-axis represents a rotation speed Nr of the ring gear 52 of the planetary gear mechanism 50; a C,55-axis represents a rotation speed Nc of the carrier 54 of the planetary gear mechanism 50 equal to a rotation speed of the carrier shaft 55; and an S,42-axis represents a rotation speed Ns of the sun gear 51 of the planetary gear mechanism 50 equal to a rotation speed No of the secondary shaft 42 of the CVT 40. In these Figures, $\rho$ represents a gear ratio (the number of teeth of the sun gear 51/the number of teeth of the ring gear 52) of the planetary gear mechanism 50.

Figure 2:
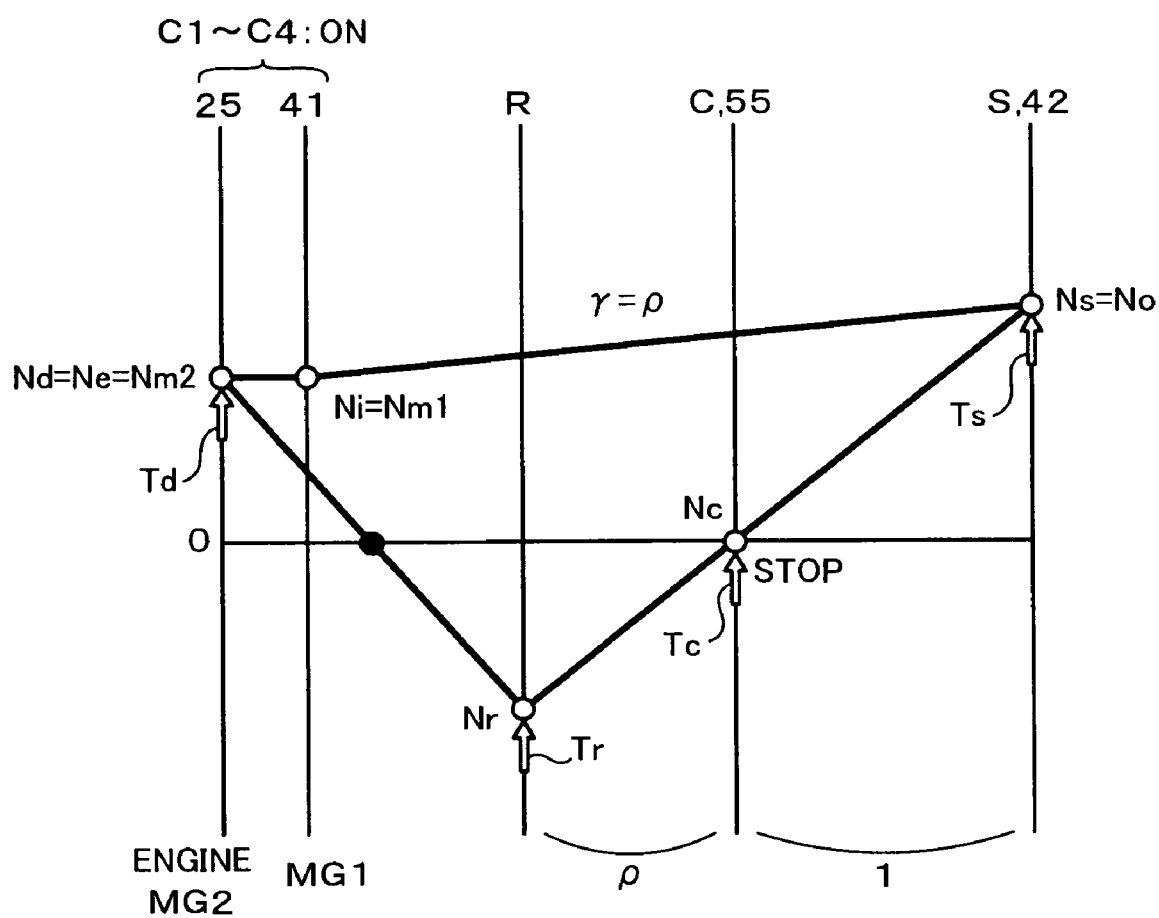
FIG. 2 is an alignment chart illustrating a relationship between rotation speeds or the like of a drive gear, elements of a CVT, and elements of a planetary gear mechanism.

As shown in FIG. 2, it is assumed that when the clutches C1 and C2 are engaged to connect the primary shaft 41 of the CVT 40, the rotating shaft of the motor MG1, and the drive gear shaft 26 (drive gear 25), and when the clutches C3 and C4 are engaged to connect the drive gear shaft 26 (drive gear 25), the rotating shaft of the motor MG2, and the crankshaft 23 of the engine 22, torque Td is applied to the drive gear shaft 26, torque Ts is applied to the sun gear 51, torque Tr is applied to the ring gear 52, and torque Tc is applied to the carrier 54 respectively. Further, when the speed ratio of the CVT 40 is denoted by γ (=Ni/Ns=Nm1/Ns), the relational Equations (1) to (3) of the torque balance are satisfied and the relational Equations (4) to (6) of the rotation speeds are satisfied. These Equations (1) to (6) can be organized to obtain the relational Equations (7) to (10). The Equation (7) represents a speed ratio α between the drive gear 25 as the rotational element and the carrier 54 (carrier shaft 55) which is the output element of the planetary gear mechanism 50. When the speed ratio γ of the CVT 40 becomes equal to the gear ratio ρ of the planetary gear mechanism 50, the speed ratio α becomes infinite (γ=ρ). At this time, the carrier 54 stops without rotating at whatever rotation speed the drive gear 25 is rotating, and as is clear from the Equations (8) to (10), torque applied to the individual elements of the planetary gear mechanism 50 becomes theoretically infinite. Thus, in a state in which the clutches C1 to C4 connect the drive gear shaft 26 to between the motor MG2 and the engine 22 (crankshaft 23) and to between the motor MG1 and the CVT 40 (primary shaft 41), even if the drive gear 25 is rotated by the power from the engine 22 or the like, the CVT 40 can be controlled so that the speed ratio γ of the CVT 40 becomes equal to the gear ratio ρ of the planetary gear mechanism 50. By doing so, the rotation of the carrier shaft 55 as the drive shaft can be stopped and the hybrid vehicle 20 can be maintained in a stopped state.

$$Tr=Tc/(1+\rho) \quad (1)$$

$$Ts=\rho \cdot Tc/(1+\rho) \quad (2)$$

$$Td=Ts/\gamma-Tr \quad (3)$$

$$Nr=(1+\rho)\cdot Nc-\rho\cdot Ns \quad (4)$$

$$Nd=\gamma \cdot Ns \quad (5)$$

$$Nr=-Nd \quad (6)$$

$$Nd/Nc=(1+\rho)/(\rho/\gamma-1)=\alpha \quad (7)$$

$$Tc=Td\cdot(1+\rho)/(\rho/\gamma-1) \quad (8)$$

$$Ts=Td\cdot\rho/(\rho/\gamma-1) \quad (9)$$

$$Tr=Td/(\rho/\gamma-1) \quad (10)$$

Further, as is clear from FIG. 2, in a state in which the drive gear shaft 26 is connected to the motor MG2 and the engine 22, when the engine 22 and the like are operated, the drive gear 25 as the rotational element rotates in the same direction as the rotational direction of the crankshaft 23 of the engine 22 and the like, and the ring gear 52 of the planetary gear mechanism 50 which meshes with the drive gear 25 rotates in a direction opposite to the rotational direction of the drive gear 25. In this case, the carrier 54 which is the output element of the planetary gear mechanism 50 can rotate both in the same direction as and in the direction opposite to the rotational direction of drive gear 25 depending on the rotational direction of the sun gear 51 which is the first input element of the planetary gear mechanism 50. According to the present embodiment, in terms of preventing an excessive rotation speed of the individual elements (especially, the sun gear 51) of the planetary gear mechanism 50, when the carrier 54 of the planetary gear mechanism 50 rotates in the direction opposite to the rotational direction of the drive gear 25 (in the same direction as that of the ring gear 52), the carrier shaft 55 as the drive shaft (directly) connected to the carrier 54 as the output element rotates in a forward direction, and the wheels DW which are the drive wheels coupled to the carrier shaft 55 via the gear train 56, the differential gear 57, and the like rotate in a direction to advance the hybrid vehicle 20 forward.

Figure 3:
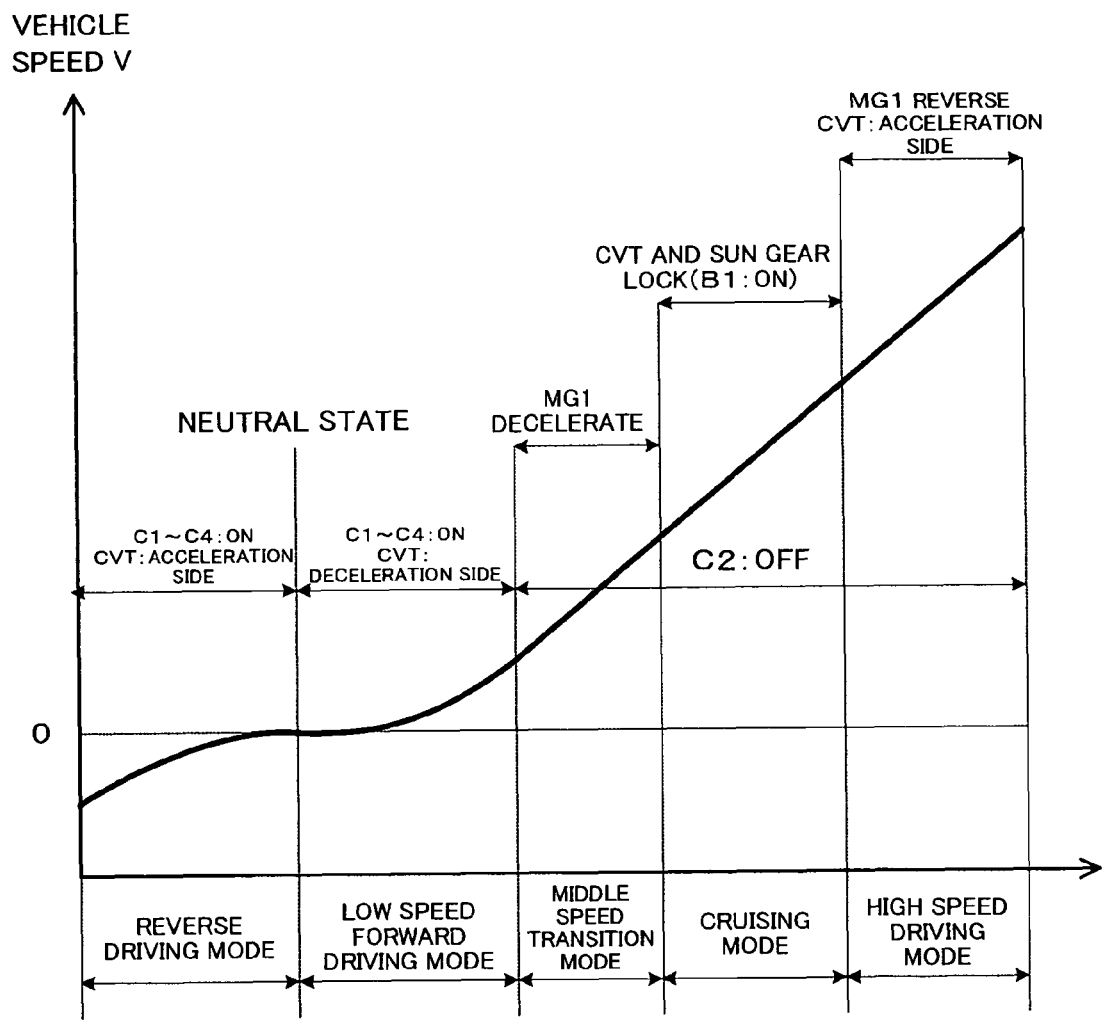
FIG. 3 illustrates an operation mode of the hybrid vehicle of the embodiment.

When the hybrid vehicle 20 configured as described above is running, the hybrid ECU 70 (driving power demand setting module) uses the accelerator opening Acc and the vehicle speed V according to the amount of depression of the accelerator pedal 83 pressed by a driver to set the torque demand (driving power demand) to be outputted to the carrier shaft 55 as the drive shaft as well as an operation point of the engine 22, torque commands for the motor MG1 and the motor MG2, and a target speed ratio of the CVT 40 so that torque (e.g., a value obtained by limiting the torque demand by the input limit and output limit of the battery 35, which is basically equal to the torque demand) based on torque demand may be outputted to the carrier shaft 55 as the drive shaft. The control signals set in this manner indicating the operation point of the engine 22, the torque commands for the motor MG1 and the motor MG2, and the target speed ratio are sent from the hybrid ECU 70 to the engine ECU 24, the motor ECU 30, and the CVT ECU 49. The individual ECU controls the engine 22, the motors MG1 and MG2, and the CVT 40 individually in response to the control signals from the hybrid ECU 70. Further, the hybrid ECU 70 performs on/off control on the clutches C1 to C4 and the brake B1 as needed. As shown in FIG. 3, an operation control mode of the hybrid vehicle 20 includes a reverse driving mode, a low speed forward driving mode, a middle speed transition mode, a cruising mode, and a high speed driving mode and the like. The operation control mode also includes a high output driving mode and a motor driving mode in which the engine 22 is stopped and power is outputted from the motors MG1 and MG2 to the carrier shaft 55 as the drive shaft.

Next, an operation of the above hybrid vehicle 20 will be described in detail. With reference to FIGS. 4 to 13, first, a description will be given to an example of operation when the hybrid vehicle 20 runs with an operation of the engine 22.

Figure 4:
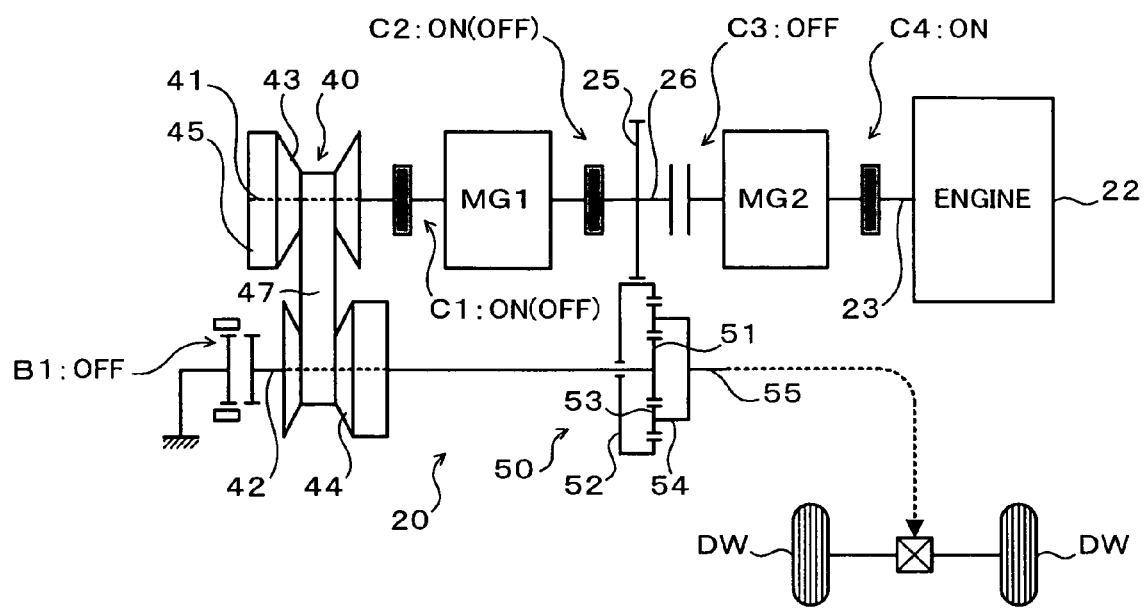
FIG. 4 is an explanatory drawing illustrating an engine start state of the hybrid vehicle in accordance with the present embodiment.

In a state in which the hybrid vehicle 20 is in a stopped state, when the driver turns on an ignition switch 80, a start process of the engine 22 is executed under the overall control of the hybrid ECU 70 except when the hybrid vehicle 20 is started in the motor driving mode. Here, when the hybrid vehicle 20 is stopped, as shown in FIG. 4, at least the clutch C3 is disengaged and the clutch C4 is engaged so as to disconnect the mutually connected motor MG2 and engine 22 from the drive gear shaft 26. Then, the motor MG2 can be used to crank the engine 22 to start the engine 22. Further, in a state in which the clutch C1 connects the primary shaft 41 of the CVT 40 and the motor MG1; the clutch C3 connects the drive gear shaft 26 and the motor MG2; and the clutch C4 connects the motor MG2 and the crankshaft 23 of the engine 22, the hybrid vehicle 20 can start the engine 22 both in a state in which the clutch C2 is disengaged and in a state in which the clutch C2 is engaged (all the clutches C1 to C4 are engaged).

Figure 5:
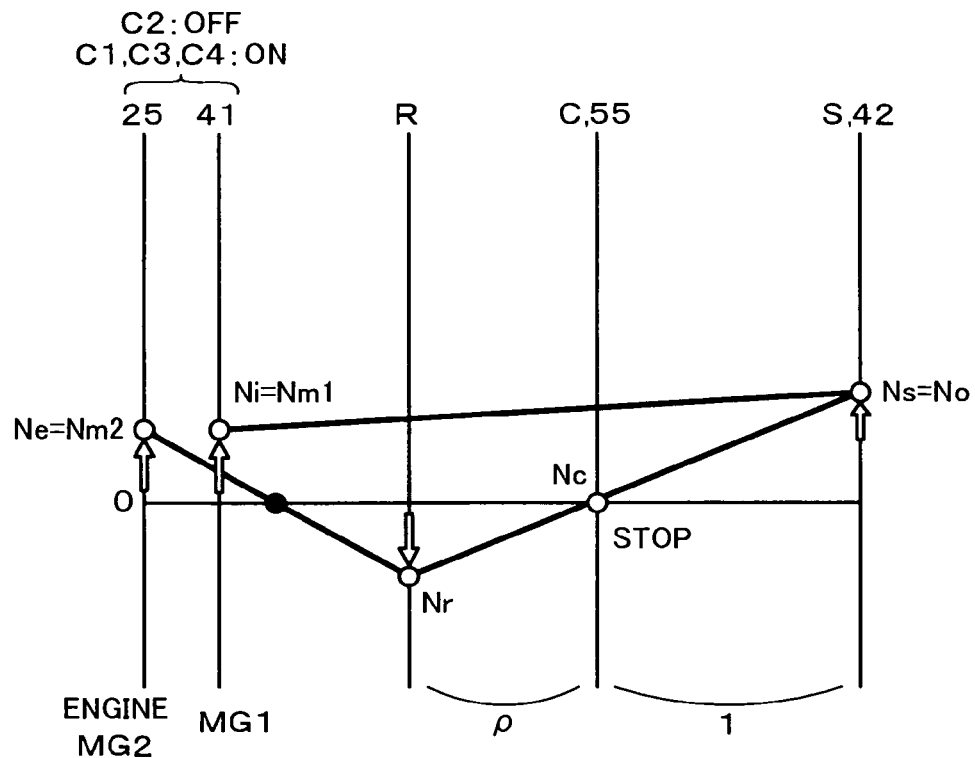
FIG. 5 is an alignment chart illustrating a relationship between the rotation speeds and the like of the drive gear, the elements of the CVT, and the elements of the planetary gear mechanism when an engine is started in the hybrid vehicle of the present embodiment.

In a state in which clutches C1, C3, and C4 are engaged and the clutch C2 is disengaged, when the engine 22 is started, the motor MG2 is controlled so as to use electric power from the battery 35 to crank the engine 22, and at least the motor MG1 is controlled so as to maintain the carrier shaft 55 in a stopped state by cancelling the torque which is generated by cranking of the engine 22 by the motor MG2 and acts on the carrier 54 as the output element. Then, fuel injection control and ignition control are started at a predetermined timing after the start of cranking by the motor MG2. When complete explosion of the engine 22 is confirmed, the start process of the engine 22 is completed. FIG. 5 is an alignment chart illustrating a dynamic relationship between the rotation speeds and torque of the drive gear 25 and the individual rotational elements of the CVT 40 and the planetary gear mechanism 50 when the engine 22 is started in a state in which clutches C1, C3, and C4 are engaged and the clutch C2 is disengaged. In this case, as is clear from FIG. 5, the motor MG2 outputs positive torque (power operation) to crank the engine 22 using electric power from the battery 35, and the motor MG1 also outputs torque upward in FIG. 5 (positive torque) (power operation) so as to cancel torque which acts on the carrier 54. At this time, the speed ratio γ of the CVT 40 may be fixed at a predetermined value or adjusted according to the output torque of the motor MG1.

Figure 6:
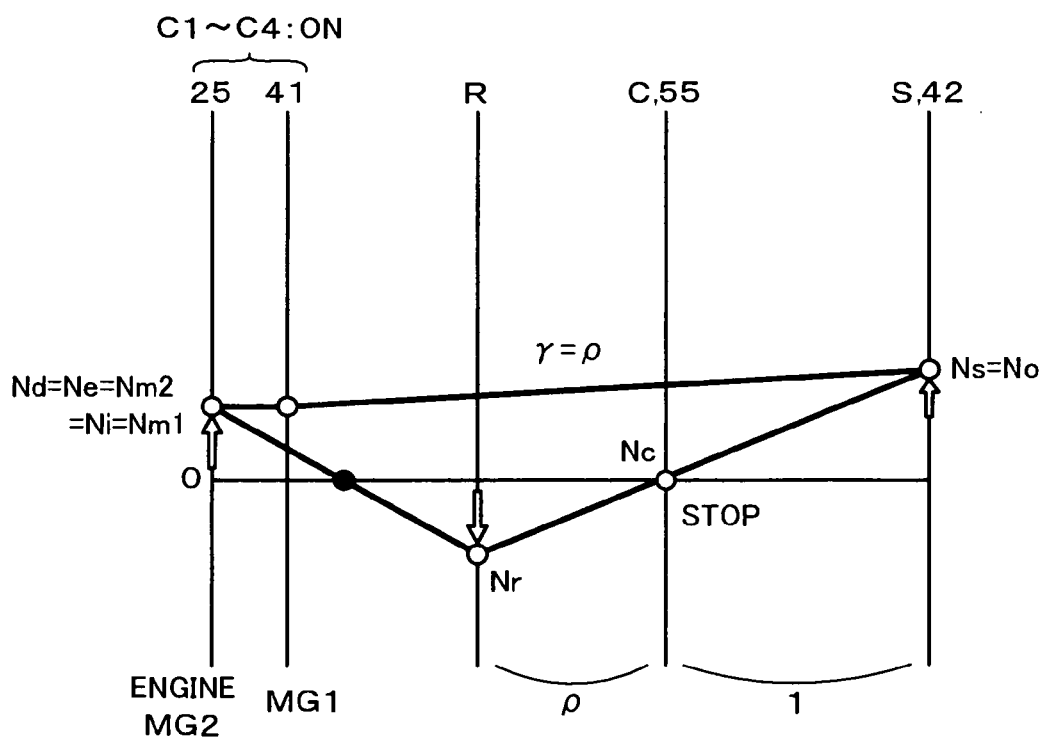
FIG. 6 illustrates another alignment chart showing a relationship between rotation speeds or the like of the drive gear, the elements of the CVT, and the elements of the planetary gear mechanism when the engine is started in the hybrid vehicle of the embodiment.

In a state in which all the clutches C1 to C4 are engaged, when the engine 22 is started, the motor MG2 is controlled so as to use electric power from the battery 35 to crank the engine 22, and the CVT 40 is controlled so as to cancel the torque which acts on the carrier 54 as the output element based on the torque generated by cranking of the engine 22 by the motor MG2 and outputted to the sun gear 51 of the planetary gear mechanism 50 via the CVT 40. In this case, fuel injection control and ignition control are also started at a predetermined timing after the start of cranking by the motor MG2. When complete explosion of the engine 22 is confirmed, the start process of the engine 22 is completed. FIG. 6 is an alignment chart illustrating a dynamic relationship between the rotation speeds and torque of the drive gear 25 and the individual rotational elements of the CVT 40 and the planetary gear mechanism 50 when the engine 22 is started in a state in which all the clutches C1 to C4 are engaged. In this case, as shown in FIG. 6, during the cranking by the motor MG2, the CVT 40 may be controlled such that the speed ratio between the primary shaft 41 (drive gear 25) and the sun gear 51 of the planetary gear mechanism 50, namely, the speed ratio γ of the CVT 40 may always match the gear ratio ρ of the planetary gear mechanism 50, and the speed ratio α between the drive gear 25 and the carrier 54 (carrier shaft 55) of the planetary gear mechanism 50 may be set to substantially infinite.

When the engine 22 is thus started, and when the clutch C3 is disengaged and the connection between the drive gear shaft 26 and the motor MG2 is released, the motor MG2 and the engine 22 are controlled such that the rotation speed Nm2 of the motor MG2 (and the rotation speed Ne of the engine 22) may be equal to a predetermined rotation speed at the time of starting; and the motor MG1 and the CVT 40 are controlled such that the rotation speed Nd (rotation speed Ni of the primary shaft 41 and the rotation speed Nm1 of the motor MG1) of the drive gear 25 (drive gear shaft 26) with the clutches C1 and C2 being engaged may be equal to the rotation speed at the time of starting and the carrier shaft 55 as the drive shaft may be maintained in a stopped state. Then, when the drive gear shaft 26 and the motor MG2 synchronously rotate, the clutch C3 is engaged and both are connected to each other. Further, when the clutches C1, C3, and C4 are engaged, and the clutch C2 is disengaged, the motor MG2 and the engine 22 are controlled such that, for example, the rotation speed Nd (the rotation speeds Ne and Nm2) of the drive gear 25 and the drive gear shaft 26 may be equal to a predetermined rotation speed at the time of starting; and the motor MG1 and the CVT 40 are controlled such that the rotation speed Ni of the primary shaft 41 and the rotation speed Nm1 of the motor MG1 may be equal to the rotation speed Nd of the drive gear shaft 26 and the carrier shaft 55 as the drive shaft may be maintained in a stopped state. Then, when the drive gear shaft 26 and the motor MG1 (primary shaft 41) synchronously rotate, the clutch C2 is engaged and both are connected to each other. It should be noted that the rotation speed of the drive gear shaft 26 (the engine 22 and the motor MG2) at the time of starting should preferably be a rotation speed at which the engine 22 can be operated with high (fuel) efficiency enough to provide relatively high torque.

Figure 7:
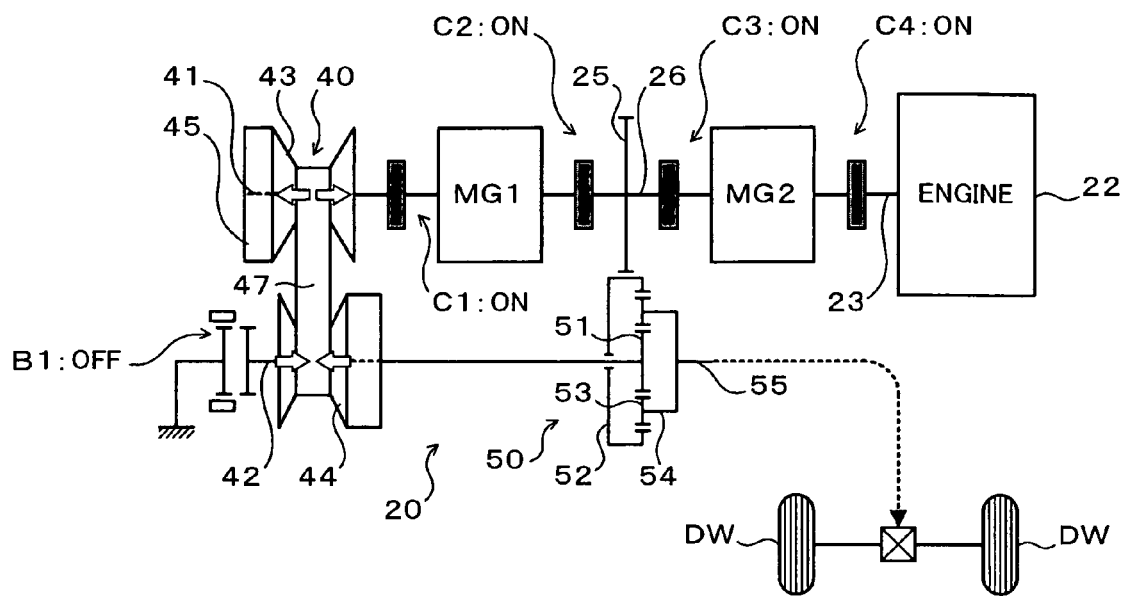
FIG. 7 illustrates a reverse driving mode and a low speed forward driving mode of the hybrid vehicle of the embodiment.
Figure 8:
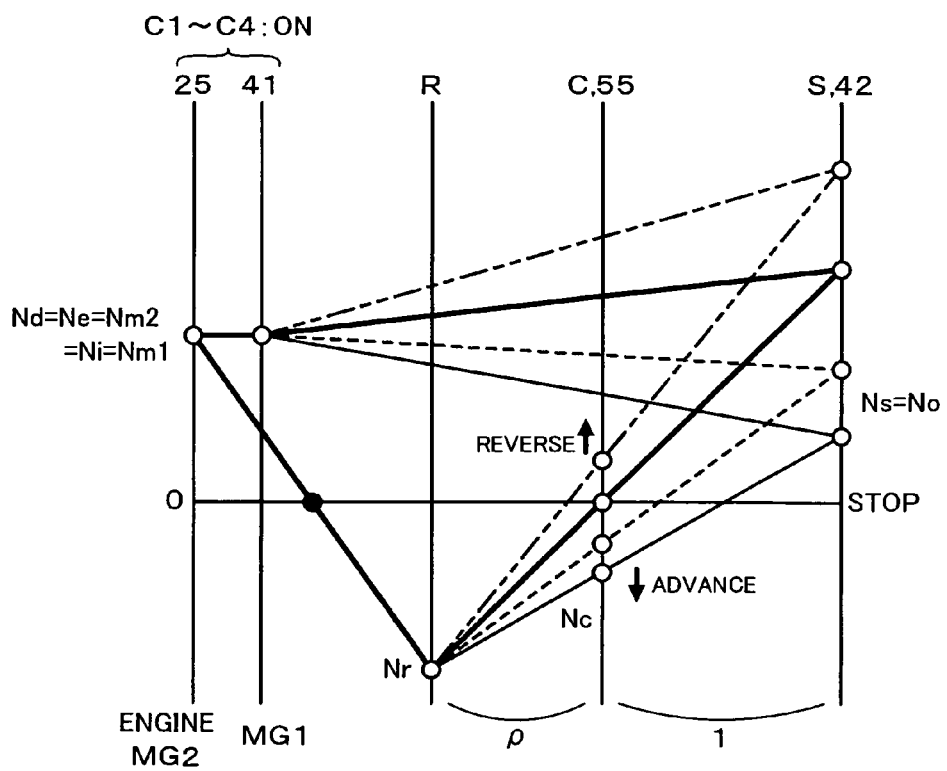
FIG. 8 is an alignment chart illustrating a relationship between rotation speeds or the like of the drive gear, the elements of the CVT, and the elements of the planetary gear mechanism in the reverse driving mode and the low speed forward driving mode.
Figure 9:
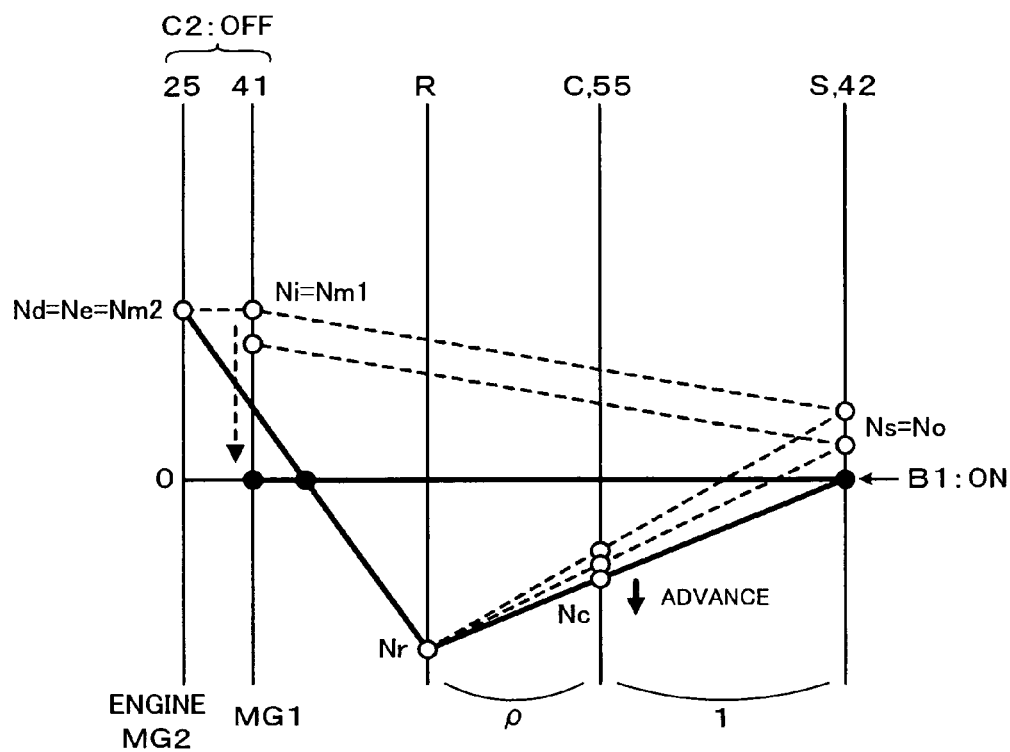
FIG. 9 is an alignment chart illustrating a relationship between rotation speeds or the like of the drive gear, the elements of the CVT, and the elements of the planetary gear mechanism in a middle speed transition mode and a cruising mode.

Hereinafter, as shown in FIG. 7, "neutral state" during operation of the engine 22 refers to a state in which all the clutches C1 to C4 are engaged, the speed ratio α between the drive gear 25 and the carrier 54 (carrier shaft 55) of the planetary gear mechanism 50 is set to substantially infinite, and the rotation speed Nd (rotation speeds Ne and Nm2) of the drive gear 25 is set to the rotation speed at the time of starting. FIG. 8 is an alignment chart illustrating a dynamic relationship between mainly the rotation speeds of the drive gear 25 and the individual rotational elements of the CVT 40 and the planetary gear mechanism 50 in the above described neutral state with one example indicated by bold lines. As is clear from FIG. 8, in the neutral state during operation of the engine 22, the ring gear 52 which is the second input element of the planetary gear mechanism 50 rotates in the direction opposite to the rotational direction of the drive gear 25, and the rotation speed Nc of the carrier 54 (carrier shaft 55) which is the output element is a value of 0 and thus the sun gear 51 which is the first input element of the planetary gear mechanism 50 rotates in the same direction as the rotational direction of the drive gear 25. It should be noted that in the neutral state, both the motors MG1 and MG2 do not always need to output torque, and thus a value of 0 may be set to the torque command for at least one of the motors MG1 and MG2 so that at least one of the motors MG1 and MG2 may be corotated with the engine 22.

When the engine 22 is started and the neutral state is set as described above, the driver can set a shift position to a D position for normal driving and depresses the accelerator pedal 83 to move the hybrid vehicle 20 forward in the "low speed forward driving mode". The driver can set the shift position to an R position for reverse driving and depresses the accelerator pedal 83 in the above neutral state to start the hybrid vehicle 20 rearward in the "reverse driving mode". Hereinafter, "reverse driving mode" will be described and then a description will be given to the "low speed forward driving mode", "middle speed transition mode", "cruising mode", "high speed driving mode", and "high output driving mode" in that order.

[Reverse Driving Mode]

When the driver sets the R position and depresses the accelerator pedal 83 in the neutral state, the hybrid ECU 70 sends a control signal to the CVT ECU 49 so that the speed ratio γ of the CVT 40 may be smaller than the gear ratio ρ of the planetary gear mechanism 50, that is, the CVT 40 accelerates the secondary shaft 42 and the sun gear 51 of the planetary gear mechanism 50. The CVT ECU 49 controls the hydraulic circuit 48 in response to the control signals from the hybrid ECU 70 so as to increase the groove width (smaller diameter) of the secondary pulley 44 of the CVT 40 or decrease the groove width (larger diameter) of the primary pulley 43. Thus, as shown by dash-double-dot lines in FIG. 8, the rotation speed Ns of the sun gear 51 in the same direction as the rotational direction of the drive gear 25 increases, and the carrier 54 (carrier shaft 55) which is the output element of the planetary gear mechanism 50 rotates in the same direction as the rotational direction of the drive gear 25. Accordingly, the carrier shaft 55 as the drive shaft can be reversely rotated, thereby allowing the hybrid vehicle 20 to run in the reverse direction. At this time, as is clear from the Equation (8), torque (Td) outputted from the engine 22 or the like to the drive gear shaft 26 is amplified and outputted to the carrier shaft 55 as the drive shaft upwardly in FIG. 8. As such, the hybrid vehicle 20 of the present embodiment can output high torque to the carrier shaft 55 as the drive shaft while the engine 22 is being efficiently operated in the reverse driving. Thus, the hybrid vehicle 20 of the present embodiment can further improve energy efficiency and torque characteristics in the reverse driving. Of course, for example, when the driver fully depresses the accelerator pedal 83 to demand high torque even in the reverse driving mode, at least one of the motors MG1 and MG2 may be caused to output drive torque so as to assist the engine 22.

[Low Speed Forward Driving Mode]

When the driver sets the D position and depresses the accelerator pedal 83 in the neutral state, the hybrid ECU 70 sends a control signal to the CVTECU 49 so that the speed ratio γ of the CVT 40 may be larger than the gear ratio ρ of the planetary gear mechanism 50, that is, the CVT 40 decelerates the secondary shaft 42 and the sun gear 51 of the planetary gear mechanism 50. The CVTECU 49 controls the hydraulic circuit 48 in response to the control signal from the hybrid ECU 70 so as to decrease the groove width (larger diameter) of the secondary pulley 44 of the CVT 40 or increase the groove width (smaller diameter) of the primary pulley 43 (see open arrows in FIG. 7). Thus, as shown by the broken lines in FIG. 8, the rotation speed Ns of the sun gear 51 in the same direction as the rotational direction of the drive gear 25 decreases, and the carrier 54 (carrier shaft 55) which is the output element of the planetary gear mechanism 50 rotates in the direction opposite to the rotational direction of the drive gear 25. Accordingly, the carrier shaft 55 as the drive shaft can be forwardly rotated, thereby allowing the hybrid vehicle 20 to run in the advancing direction. At this time, as is clear from the Equation (8), torque (Td) outputted from the engine 22 or the like to the drive gear shaft 26 is amplified and outputted to the carrier shaft 55 as the drive shaft downwardly in FIG. 8. As such, the hybrid vehicle 20 of the present embodiment at the time of forward starting can output high torque to the carrier shaft 55 as the drive shaft while the engine 22 is being efficiently operated. Thus, the hybrid vehicle 20 of the present embodiment can further improve energy efficiency and torque characteristics at the time of starting. After the start, the CVT 40 is controlled so as to further increase the speed ratio γ, and thus high torque can be outputted to the carrier shaft 55 as the drive shaft to accelerate the hybrid vehicle 20 in the advancing direction as shown by the thin solid lines in FIG. 8. Further, in the low speed forward driving mode, the speed ratio γ of the CVT 40 is adjusted and the operation point of the engine 22 is changed to increase the torque from the engine 22, or drive torque is outputted from at least one of the motors MG1 and MG2 to assist the engine 22, thereby further improving the torque characteristics in the low speed forward driving mode. The low speed forward driving mode continues until a first shift condition is satisfied such that the speed ratio γ of the CVT 40 decreases to a predetermined value (for example, a maximum speed ratio). When the shift condition is satisfied, the operation mode of the hybrid vehicle 20 is shifted from the low speed forward driving mode to the middle speed transition mode.

[Middle Speed Transition Mode]

When the above first shift condition is satisfied according to the driver's operation of the accelerator pedal 83 or the like, the hybrid ECU 70 sends a control signal to the actuator of the clutch C2 so as to release the connection between the motor MG1 and the drive gear shaft 26. Thus, when the clutch C2 is disengaged and the connection between the motor MG1 and the drive gear shaft 26 is released, the primary shaft 41 can be rotated independently of the drive gear shaft 26. Then, the hybrid ECU 70 sets the operation point of the engine 22, the torque commands for the motor MG1 and the motor MG2, and the target speed ratio of the CVT 40 so that the speed ratio γ of the CVT 40 is maintained at the above predetermined value, the rotation speed Nm1 (rotation speed Ni) of the motor MG1 decreases and the torque based on torque demand is outputted to the carrier shaft 55 as the drive shaft. The engine ECU 24, the motor ECU 30, the CVT ECU 49 control the engine 22, the motors MG1 and MG2, and the CVT 40 in response to the control signal from the hybrid ECU 70 respectively. Thus, as shown by the broken lines in FIG. 9, as the motor MG1 decelerates, the rotation speed Ns of the sun gear 51 of the planetary gear mechanism 50 connected to the motor MG1 via the CVT 40 decreases. Then, the rotation speed (vehicle speed V) of the carrier shaft 55 is increased at the forward rotation side (advancing side), as shown by the solid lines in the same figure, and then the motor MG1 is temporarily stopped. By doing so, the rotation speed Ns of the sun gear 51 of the planetary gear mechanism 50 connected to the secondary shaft 42 of the CVT 40 can be set to a value of 0. It should be noted that in the middle speed transition mode, the motor MG1 outputs downward torque in FIG. 9 to generate electric power, and the electric power generated by the motor MG1 is used mainly for charging the battery 35 and is used for driving the motor MG2 as needed. When the hybrid vehicle 20 is decelerated in the middle speed transition mode, the hybrid ECU 70 sets the operation point of the engine 22, the torque commands for the motor MG1 and the motor MG2, and the target speed ratio of the CVT 40 so that the speed ratio γ of the CVT 40 is maintained at the predetermined value, the rotation speed Nm1 (rotation speed Ni) of the motor MG1 is increased (accelerated), and the torque based on torque demand is outputted to the carrier shaft 55 as the drive shaft.

[Cruising Mode]

Figure 10:
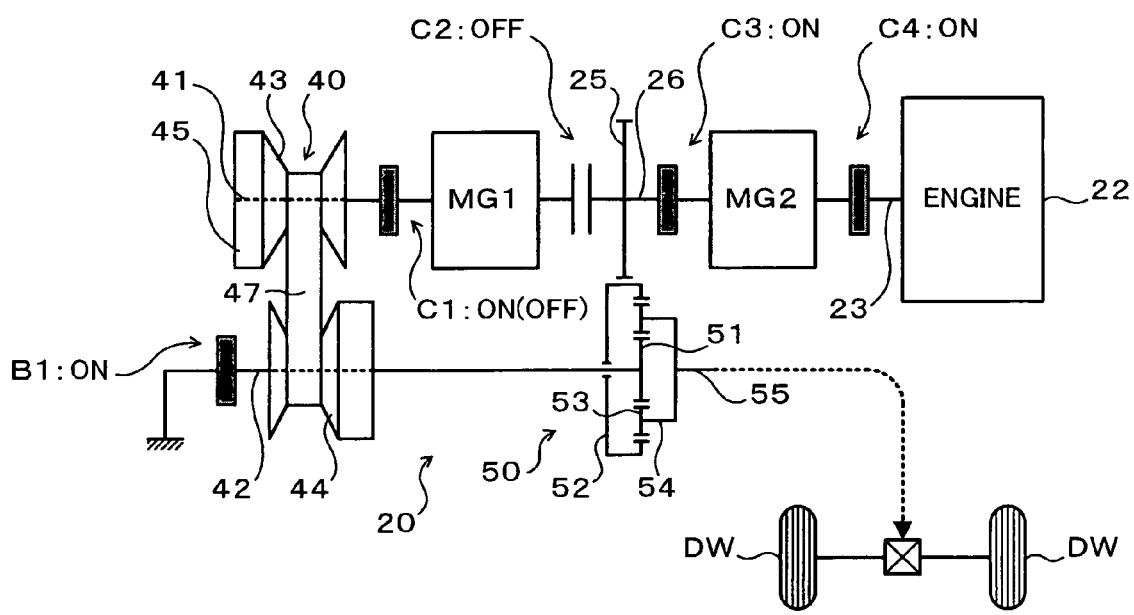
FIG. 10 illustrates the cruising mode of the hybrid vehicle of the embodiment.
Figure 11:
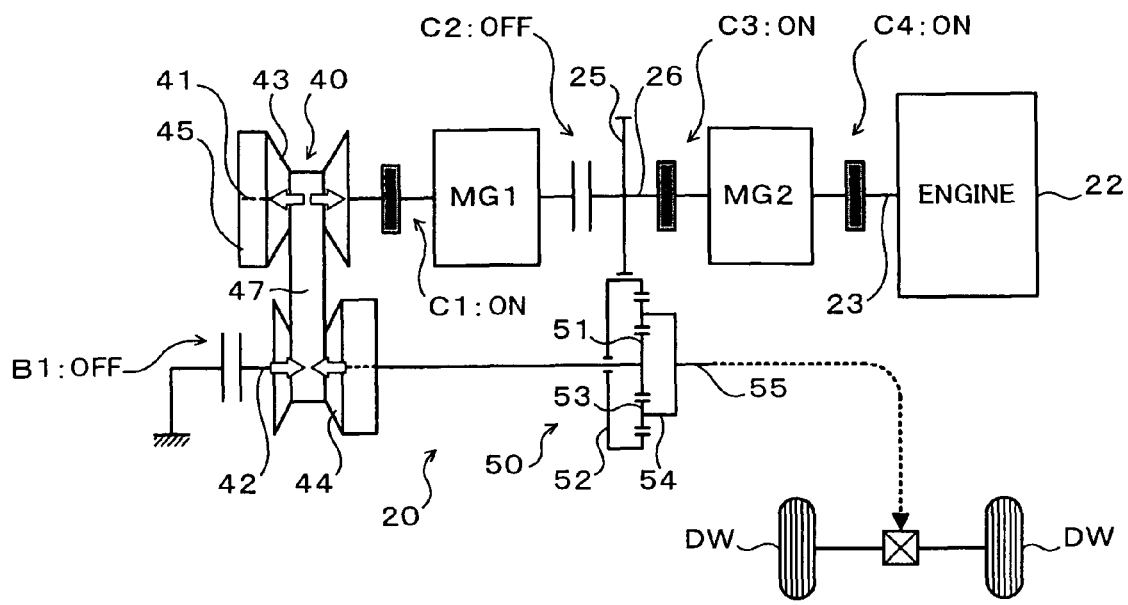
FIG. 11 illustrates a high speed driving mode of the hybrid vehicle of the embodiment.
Figure 12:
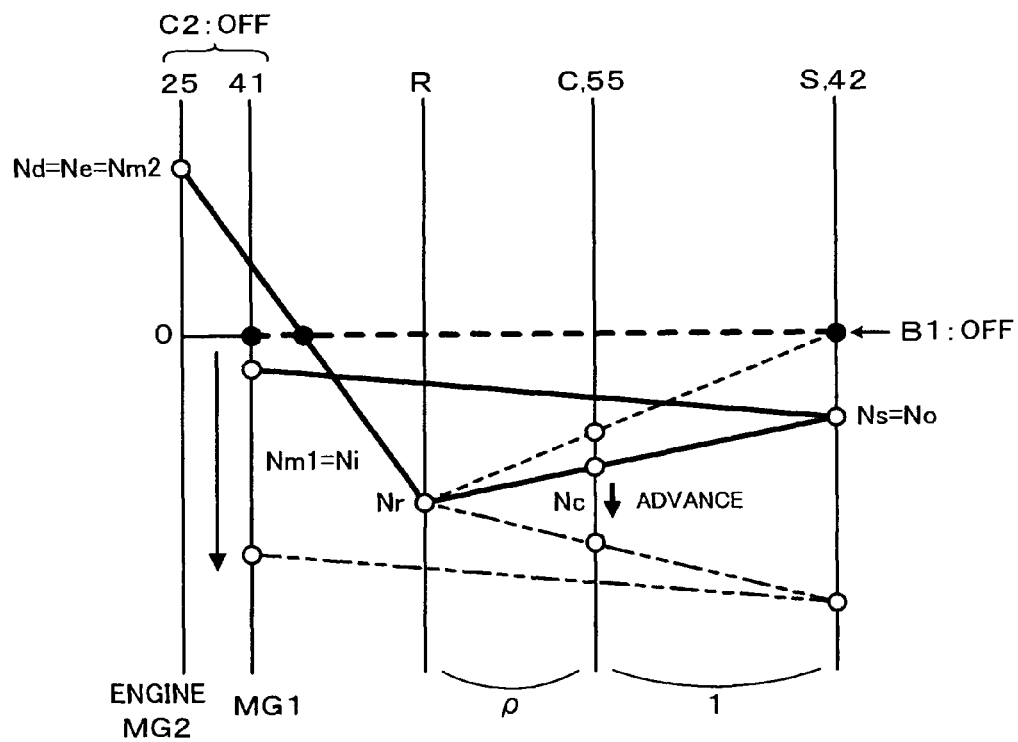
FIG. 12 is an alignment chart illustrating a relationship between rotation speeds or the like of the drive gear, the elements of the CVT, and the elements of the planetary gear mechanism in the high speed driving mode.

In the above middle speed transition mode, when the motor MG1 connected to the primary shaft 41 of the CVT 40 stops and the sun gear 51 of the planetary gear mechanism 50 connected to the secondary shaft 42 of the CVT 40 stops rotating, as shown in FIG. 10, the brake B1 can be applied to non-rotatably fix the secondary shaft 42 and the sun gear 51 and lock the CVT 40. When the sun gear 51 of the planetary gear mechanism 50 is non-rotatably fixed in this manner, as shown by the solid lines in FIG. 9, the torque outputted to the drive gear shaft 26 by the engine 22 and the like can be transmitted to the carrier shaft 55 as the drive shaft via the drive gear 25 and the planetary gear mechanism 50 without using the CVT 40. Thus, according to the hybrid vehicle 20 of the present embodiment, in the middle speed transition mode, in a running state before the motor MG1 and the sun gear 51 of the planetary gear mechanism 50 stop rotating, or in a state in which the a driver's demand (for example, an accelerator opening Acc, the degree of change thereof, or the like) satisfies a second shift condition, the hybrid ECU 70 applies the brake B1 to lock the CVT 40 with the motor MG1 being stopped, and the operation mode shifts from the middle speed transition mode to a cruising shift mode. In the cruising shift mode, the hybrid ECU 70 sets the operation point of the engine 22 and the torque command for the motor MG2 so that the torque based on torque demand is outputted to the carrier shaft 55 as the drive shaft; and the engine ECU 24 and the motor ECU 30 control the engine 22 and the motor MG2 in response to the control signal from the hybrid ECU 70 respectively. Thus, in the cruising mode, power outputted to the drive gear shaft 26 by the engine 22 and the like can be relatively efficiently transmitted to the carrier shaft 55 as the drive shaft without a loss in the CVT 40, thereby further improving energy efficiency. It should be noted that in the cruising mode, basically in terms of maintaining the state of charge (SOC) of the battery 35, the power may be outputted only by the engine 22 by setting an operation point at which the engine 22 can be operated efficiently. Alternatively, drive torque may be outputted by the motor MG2 so as to assist the engine 22 as needed. Further, the motor MG2 may be caused to generate electric power using part of (or all of) the power from the engine 22 and the electric power generated by the motor MG2 may be used to charge the battery 35.

[High Speed Driving Mode]

In the case where in the above described middle speed transition mode, when the motor MG1 stops and the sun gear 51 of the planetary gear mechanism 50 stops rotating, a third shift condition different from the above second shift condition is satisfied or in the case where the driver makes a moderate acceleration demand in the cruising mode, the operation mode of the hybrid vehicle 20 shifts from the middle speed transition mode or the cruising mode to the high speed driving mode. When the operation mode of the hybrid vehicle 20 is shifted to the high speed driving mode, the hybrid ECU 70 checks whether the brake B1 is applied. If the brake B1 is applied, the hybrid ECU 70 sends a control signal to the actuator of the brake B1 so as to unlock the sun gear 51 of the planetary gear mechanism 50 and the CVT 40. When the clutch C2 and the brake B1 are released (see FIG. 11), the hybrid ECU 70 sets the operation point of the engine 22, the torque commands for the motors MG1 and MG2, and the target speed ratio of the CVT 40 so that the motor MG1 rotates in a direction opposite to the rotational direction of the motor MG1 running in the above described low speed forward driving mode and the like, that is, the motor MG1 rotates in the same direction as the rotational direction of the ring gear 52 and the carrier 54 of the planetary gear mechanism 50, and the torque based on torque demand is outputted to the carrier shaft 55 as the drive shaft. The engine ECU 24, the motor ECU 30, the CVT ECU 49 control the engine 22, the motors MG1 and MG2, and the CVT 40 in response to the control signal from the hybrid ECU 70 respectively. Specifically, when the clutch C2 releases the connection between the motor MG1 and the drive gear shaft 26, the motor MG1 can rotate the primary shaft 41 in a direction opposite to the rotational direction of the drive gear shaft 26. More specifically, as shown by the solid lines in FIG. 12, when the rotation speed Nm1 (rotation speed Ni) of the motor MG1 is increased in a direction opposite to the rotational direction of the drive gear 25, namely, in the same direction as the ring gear 52 and the like of the planetary gear mechanism 50, the sun gear 51 of the planetary gear mechanism 50 connected to the secondary shaft 42 of the CVT 40 can be rotated in a direction opposite to the rotational direction of the drive gear 25, namely, in the same direction as the ring gear 52 and the carrier 54 and the rotation speed Ns can be increased. In addition, as shown by open arrows in FIG. 11, when the speed ratio γ of the CVT 40 is further decreased by decreasing the groove width of the primary pulley 43 of the CVT 40 or by increasing the groove width of the secondary pulley 44, as shown by the dash-double-dot lines in FIG. 12, the rotation speed Ns of the sun gear 51 of the planetary gear mechanism 50 can be further increased in the direction opposite to the rotational direction of drive gear 25. The further increased rotation speed Ns in the direction opposite to the rotational direction of the drive gear 25 of the sun gear 51 of the planetary gear mechanism 50, the further decreased (larger speed increasing ratio) the speed ratio α between the drive gear 25 and the carrier 54 which is the output element of the planetary gear mechanism 50, namely, the carrier shaft 55 as the drive shaft. Thus, the rotation speed in the forward rotation side of the carrier shaft 55, namely, the vehicle speed V can be further increased. In the high speed driving mode, particularly when cruising at very high speeds, large torque is less required to be outputted to the carrier shaft 55 as the drive shaft. In such cases, in terms of maintaining the state of charge (SOC) of the battery 35, the motor MG2 may be caused to use part of (or all of) the power from the engine 22 to generate electric power so that the electric power generated by the motor MG2 may be used to drive the motor MG1 or to charge the battery 35. Of course, even in the high speed driving mode, there may be a case in which the battery 35 is sufficiently charged. In such a case, the motor MG1 may be driven by the electric power from the battery 35 and drive torque may be outputted by the motor MG2 so as to operate the engine 22 at an efficiently operable operation point and assist the engine 22 at all the times or as needed.

[High Output Driving Mode]

Figure 13:
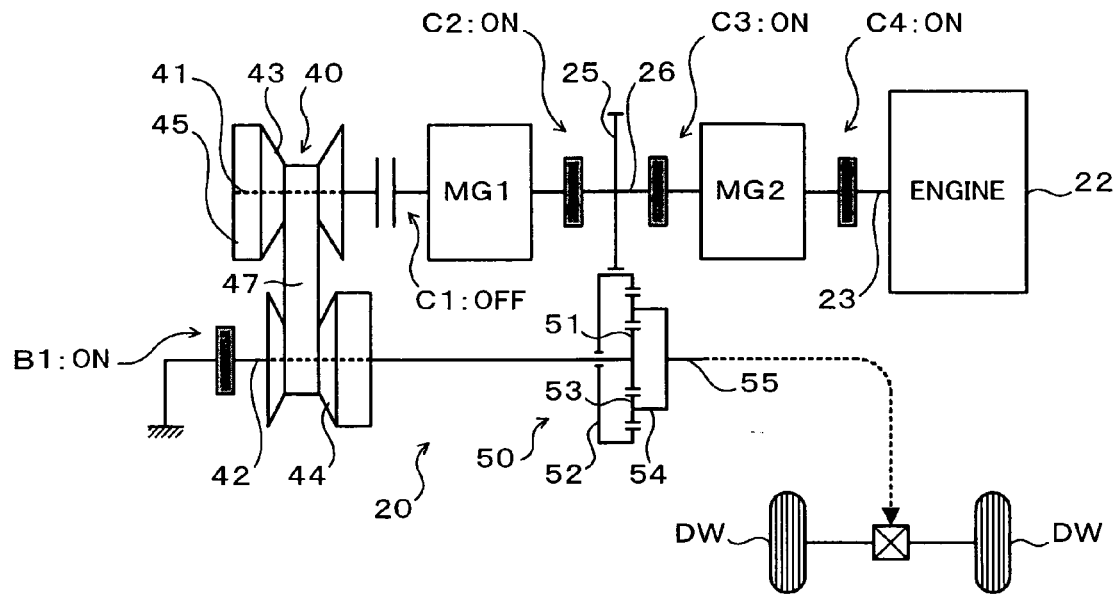
FIG. 13 is an explanatory drawing for explaining a high output driving mode of the hybrid vehicle in accordance with the present embodiment.

In the case where in the above described middle speed transition mode, when the motor MG1 stops and the sun gear 51 of the planetary gear mechanism 50 stops rotating, a fourth shift condition different from the above second and third shift conditions is satisfied, or in the case in which the driver makes a sudden acceleration demand in the cruising mode, the operation mode of the hybrid vehicle 20 shifts from the middle speed transition mode or the cruising mode to the high output driving mode. When the operation mode of the hybrid vehicle 20 is shifted to the high output driving mode, the hybrid ECU 70 sets the operation point of the engine 22 and the torque commands for the motors MG1 and MG2 so as to output the torque based on torque demand to the carrier shaft 55 as the drive shaft, and checks whether the brake B1 is applied. If the brake B1 is not applied, the hybrid ECU 70 sends a control signal to the actuator of the brake B1 so as to lock the sun gear 51 of the planetary gear mechanism 50 and the CVT 40. And in the state where the brake B1 is applied, the hybrid ECU 70 further sends a control signal to the clutch C1 so as to disconnect the motor MG1 from the CVT 40. When the brake B1 is applied and the clutch C1 is disengaged, the hybrid ECU 70 sets the operation point of the engine 22 and the torque commands for the motors MG1 and MG2 so that the motor MG1 synchronously rotates with the drive gear 25 and the torque based on torque demand is outputted to the carrier shaft 55 as the drive shaft. When the motor MG1 synchronously rotates with the drive gear 25, the hybrid ECU 70 sends a control signal to the clutch C2 so as to connect the rotating shaft of the motor MG1 and the drive gear shaft 26. After the clutch C2 is engaged, as shown in FIG. 13, the hybrid ECU 70 sets the operation point of the engine 22 and the torque commands for the motors MG1 and MG2 so that the torque based on torque demand is outputted to the carrier shaft 55 as the drive shaft. During this time, the engine ECU 24 and the motor ECU 30 controls the engine 22 and the motors MG1 and MG2 in response to the control signals from the hybrid ECU 70 respectively. Thus, in the high output driving mode, all the power outputted to the drive gear shaft 26 from the engine 22 and the motors MG1 and MG2 can be transmitted to the carrier shaft 55 as the drive shaft via the planetary gear mechanism 50 without loss in the CVT 40, thereby further improving acceleration performance in a high speed driving of the hybrid vehicle 20. It should be noted that as shown in FIG. 13, in a state in which the clutch C1 is disengaged and the clutches C2 to C4 are engaged, drive torque is not outputted so as to cause both the motors MG1 and MG2 to assist the engine 22 as described above, but instead, causes the motor MG2 to generate electric power using part of the power from the engine 22, and the electric power generated by the motor MG2 may be used to drive the motor MG1.

As described above, the hybrid vehicle 20 of the present embodiment continuously changes the rotation speed Ns of the sun gear 51 of the planetary gear mechanism 50 within the range including a value of 0 to prevent an excessive rotation speed of the individual elements (especially, the sun gear 51 which is the first input element) of the planetary gear mechanism 50. This allows a forward rotation and a reverse rotation of the carrier shaft 55 as the drive shaft, that is, the hybrid vehicle 20 can run in an advancing direction and in a reverse direction. Further, this can increase the speed ratio range between the drive gear 25, namely, the engine 22 and the motors MG1 and MG2, and the carrier shaft 55 as the drive shaft during forward running. It should be noted that hereinbefore the description has been given to the operation of accelerating the hybrid vehicle 20 forward with reference to FIGS. 4 to 13. In order to decelerate the hybrid vehicle 20 running at high speeds, a procedure opposite to the above procedure may be basically followed to control the engine 22, the motors MG1 and MG2, the CVT 40, the clutches C1 to C4, and the brake B1.

[Motor Driving Mode]

Hereinafter, the description will be given to the motor driving mode in which the hybrid vehicle 20 runs in a state where the engine 22 is stopped, with the power being outputted to the carrier shaft 55 as the drive shaft from at least one of the motors MG1 and MG2.

Figure 14:
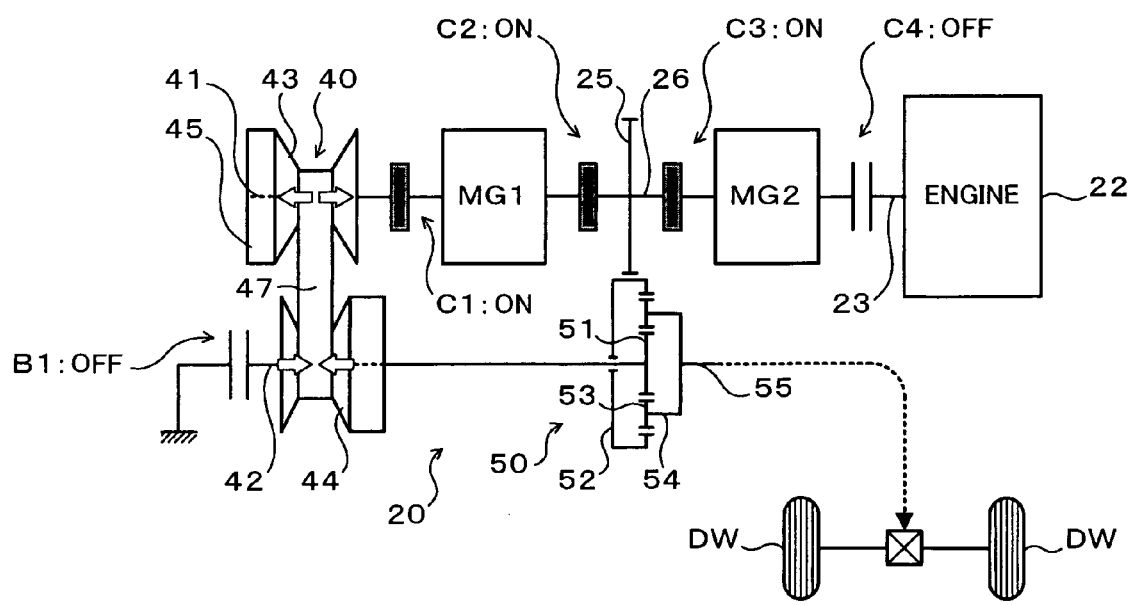
FIG. 14 illustrates a motor driving mode of the hybrid vehicle of the embodiment.

According to the hybrid vehicle 20 of the present embodiment, as shown in FIG. 14, the clutches C1 to C3 are engaged and the clutch C4 is disengaged to disconnect the motor MG2 from the crankshaft 23 of the engine 22. In this state, the rotation speed Nd of the drive gear shaft 26 is set to a predetermined value so that at least one of the motors MG1 and MG2 may output power to the drive gear shaft 26. Further, the CVT 40 is controlled so that the speed ratio α between the drive gear 25 and the carrier 54 (carrier shaft 55) of the planetary gear mechanism 50 may be set to substantially infinite. By doing so, "neutral state" in the motor driving mode can be set. Then, in this neutral state, the CVT 40 is controlled so that the speed ratio γ is smaller than the gear ratio ρ of the planetary gear mechanism 50. This allows a reverse rotation of the carrier shaft 55 as the drive shaft so that the hybrid vehicle 20 may run backward (reverse motor driving mode). At this time, torque (Td) outputted from at least one of the motors MG1 and MG2 to the drive gear shaft 26 is amplified to be outputted to the carrier shaft 55 as the drive shaft. When both the motors MG1 and MG2 are controlled to output power to the drive gear shaft 26, a higher torque can be outputted to the carrier shaft 55 as the drive shaft for backward running in the motor driving mode. In the neutral state, when the CVT 40 is controlled so that the speed ratio γ is larger than the gear ratio ρ of the planetary gear mechanism 50, the carrier shaft 55 as the drive shaft can be forwardly rotated, thereby allowing the hybrid vehicle 20 to run in the advancing direction (low speed forward motor driving mode). At this time, torque (Td) outputted from at least one of the motors MG1 and MG2 to the drive gear shaft 26 is amplified to be outputted to the carrier shaft 55 as the drive shaft. When both the motors MG1 and MG2 are controlled to output power to the drive gear shaft 26, a higher torque can be outputted to the carrier shaft 55 as the drive shaft for forward running (advancing) in the motor driving mode.

While running in a state (in the low speed forward motor driving mode) shown in FIG. 14, the motor MG2 is controlled to output the torque based on torque demand to the carrier shaft 55 as the drive shaft. In this state, the clutch C2 is disengaged to disconnect the motor MG1 from the drive gear shaft 26 and the rotation speed Nm1 (rotation speed Ni) of the motor MG1 decreases. Then, the sun gear 51 of the planetary gear mechanism 50 connected to the secondary shaft 42 of the CVT 40 can stop rotating. When the motor MG1 stops and the secondary shaft 42 and the sun gear 51 of the planetary gear mechanism 50 stop rotating, as shown in FIG. 15, the brake B1 is applied to non-rotatably fix the secondary shaft 42 and the sun gear 51 and lock the CVT 40. Then, the power outputted to the drive gear shaft 26 from the motor MG2 can be relatively efficiently transmitted to the carrier shaft 55 as the drive shaft without a loss in the CVT 40 (cruising motor driving mode). Further, while running in a state (in the cruising motor driving mode) shown in FIG. 15, the motor MG2 is controlled to output the torque based on torque demand to the carrier shaft 55 as the drive shaft. In this state, the clutch C1 is disengaged to disconnect the motor MG1 from the CVT 40 and the motor MG1 synchronously rotates with the drive gear 25. Then, as shown in FIG. 16, the clutch C2 can be engaged to connect the motor MG1 and the drive gear shaft 26. After the clutch C2 is engaged, the power outputted to the drive gear shaft 26 from both the motors MG1 and MG2 can be transmitted to the carrier shaft 55 as the drive shaft via the planetary gear mechanism 50 without a loss in the CVT 40, thereby further improving acceleration performance and high speed running performance of the hybrid vehicle 20 in motor driving mode (high output motor driving mode). Further, in a state where the clutches C1 and C3 are engaged, and the clutches C2 and C4 and the brake B1 are disengaged, like the high speed driving mode during the operation of the engine 22, the rotation speed Nm1 (rotation speed Ni) of the motor MG1 further increases in the direction opposite to the rotational direction of drive gear 25 and the speed ratio γ of the CVT 40 changes as needed. Thus, the speed ratio α between the drive gear 25 and the carrier 54 which is the output element of the planetary gear mechanism 50, namely, the carrier shaft 55 as the drive shaft can be further decreased (larger speed increasing ratio) and the rotation speed in the forward rotation side of the carrier shaft 55, namely, the vehicle speed V can be further increased (high speed motor driving mode). While the motor driving mode is being performed, the clutch C4 is always disengaged to disconnect the motor, MG2 from the crankshaft 23 of the engine 22. Thus, the power from at least one of the motors MG1 and MG2 can be outputted to the carrier shaft 55 as the drive shaft without corotation of the engine 22.

Figure 17:
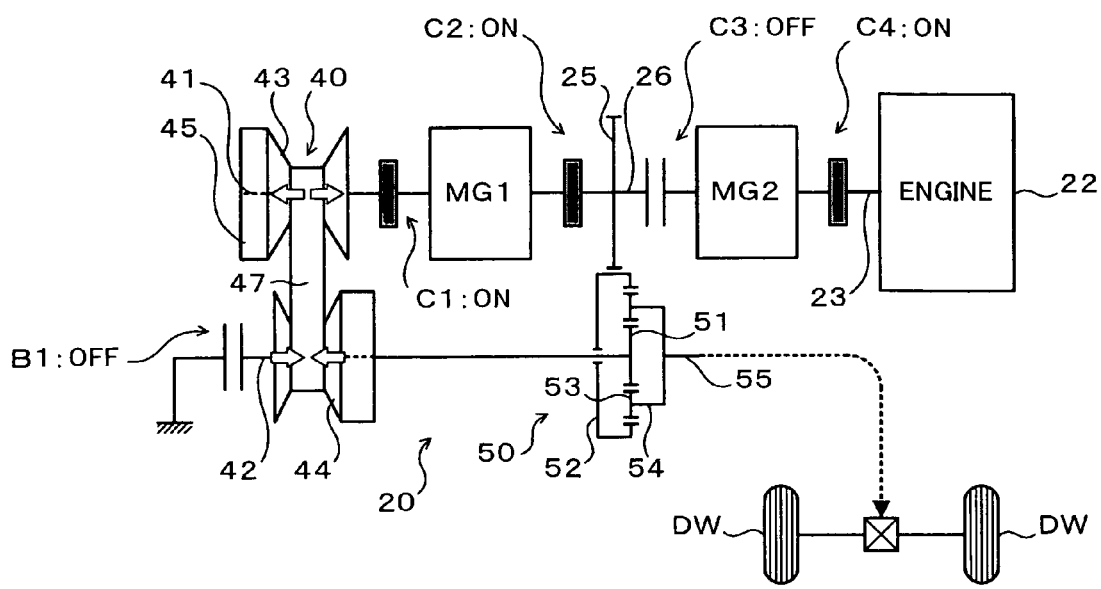
FIG. 17 illustrates a motor driving mode of the hybrid vehicle of the embodiment.
Figure 18:
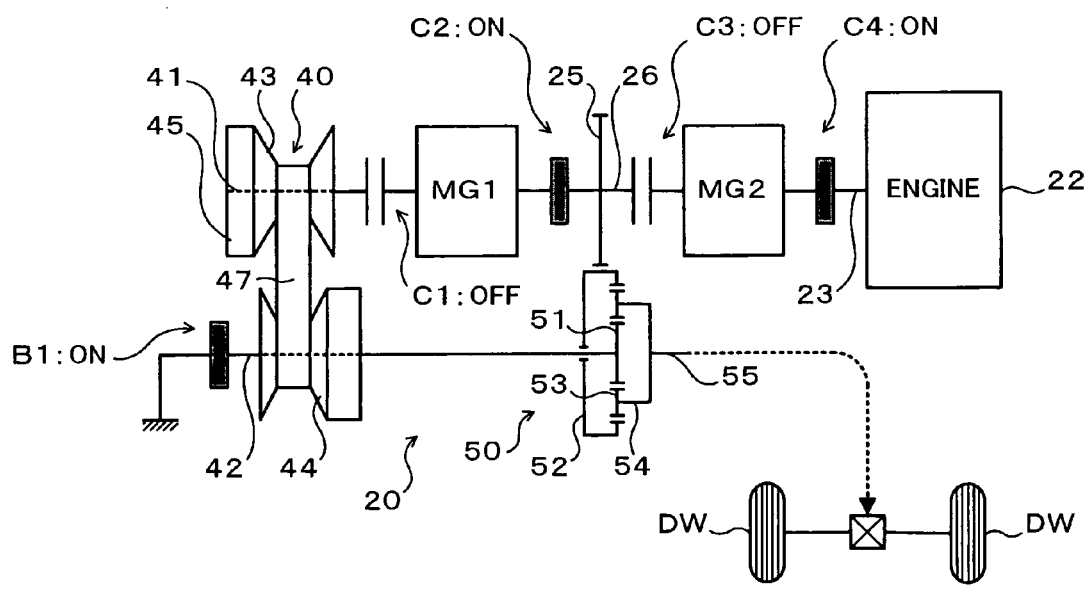
FIG. 18 illustrates a motor driving mode of the hybrid vehicle of the embodiment.

In addition, according to the hybrid vehicle 20 of the present embodiment, as shown in FIGS. 17 and 18, when the clutch C3 is disengaged to disconnect the drive gear shaft 26 from the motor MG2, the engine 22 and the motor MG2 can be simultaneously disconnected from motor MG1 and the like. When the clutch C3 is disengaged to disconnect the drive gear shaft 26 from the motor MG2, as shown in FIG. 17, if the clutches C1 and C2 are engaged and the brake B1 is disengaged, the power only from the motor MG1 can be split from the drive gear 25 and the CVT 40 so as to be outputted to the planetary gear mechanism 50 and to be transmitted to the carrier shaft 55 as the drive shaft. Alternatively, when the clutch C3 is disengaged to disconnect the drive gear shaft 26 from the motor MG2, as shown in FIG. 18, the clutch C1 is disengaged. In this state when both the clutch C2 and the brake B1 are engaged, the power only from the motor MG1 can be transmitted to the carrier shaft 55 as the drive shaft via the drive gear 25 and the planetary gear mechanism 50. Then, in a state where the clutch C3 is disengaged and the clutch C4 is engaged, the motor MG2 is caused to use all the power from the engine 22 to generate electric power. The generated electric power can be used to drive the motor MG1 or charge the battery 35; the electric power from the battery 35 can be used to drive the motor MG1, thereby allowing the hybrid vehicle 20 to function as a so-called series hybrid vehicle.

It should be noted that when the engine 22 stopped in the motor driving mode is started, if the clutch C3 is engaged, the clutch C3 is disengaged to disconnect the drive gear shaft 26 from the motor MG2. Further, when the motor MG2 is operated, the motor MG2 is controlled so as to decrease the rotation speed Nm2 and the motor MG2 is temporarily stopped. Next, in a stage where the motor MG2 stops, the clutch C4 is engaged to connect the motor MG2 and the crankshaft 23 of the engine 22. Then, the motor MG1 (and the CVT 40) is controlled so that the torque based on torque demand may be outputted to the carrier shaft 55 as the drive shaft; and the motor MG2 is controlled to use the electric power from the battery 35 to crank the engine 22. Then, fuel injection control and ignition control are started at a predetermined timing after the start of cranking by the motor MG2. When complete explosion of the engine 22 is confirmed, the engine 22, the motors MG1 and MG2 (and the CVT 40) are controlled so that the torque based on torque demand may be outputted to the carrier shaft 55 as the drive shaft and the drive gear shaft 26 may synchronously rotate with the motor MG2 (crankshaft 23). Subsequently, when the drive gear shaft 26 synchronously rotates with the motor MG2, the clutch C3 is engaged. When the clutch C3 is thus engaged, control starts so as to run the hybrid vehicle 20 with operation of the engine 22.

[Other Operations]

The hybrid vehicle 20 of the present embodiment includes the motors MG1 and MG2. When the driver depresses the brake pedal 85 during running, kinetic energy can be converted into electrical energy by regenerative operation of at least one of the motors MG1 and MG2 to output a braking force(braking torque) to the carrier shaft 55 as the drive shaft. In a state where at least clutches C1 to C3 are engaged, when the driver depresses the brake pedal 85, the clutch C2 is disengaged to disconnect the motor MG1 from the drive gear shaft 26. Then, the motor MG1 and the motor MG2 can be controlled separately to further efficiently recover energy from both the motors MG1 and MG2. Specifically, when the driver depresses the brake pedal 85, the clutch C2 is disengaged and the CVT 40 is controlled so as to maintain a high rotation speed Nm1 of the motor MG1. Even when the rotation speed of the carrier shaft 55, that is, the vehicle speed V decreases to such a level that regenerative braking generally cannot be performed, energy recovery from the motor MG1 is continued. Thus the energy efficiency of the hybrid vehicle 20 can be improved. It should be noted that in a state where the clutch C4 connects the motor MG2 and the crankshaft 23 of the engine 22, when the driver depresses the brake pedal 85, the clutch C4 may be disengaged to disconnect motor MG2 from the crankshaft 23 of the engine 22 or the clutch C4 may be engaged as is and braking torque (engine brake) by friction of the engine 22 may be used.

As described above, according to the hybrid vehicle 20 of the present embodiment, the drive gear 25, the CVT 40, and the planetary gear mechanism 50 constitute the infinitely variable transmission (IVT) where the clutches C1 to C4 connect the drive gear shaft 26 (drive gear 25) to between the motor MG2 and the engine 22 and to between the motor MG1 and the CVT 40 which operate in cooperation with each other. The power from at least one of the engine 22 and the motors MG1 and MG2 is split from the drive gear 25 and the CVT 40 to be outputted to the planetary gear mechanism 50, causing a torque circulation. The speed ratio α between the drive gear 25 and the carrier 54 (carrier shaft 55 as the drive shaft) which is the output element of the planetary gear mechanism 50 can be set to theoretically infinite. Therefore, according to the hybrid vehicle 20, the speed ratio γ of the CVT 40 is made equal to the gear ratio ρ of the planetary gear mechanism 50 and the speed ratio α between the drive gear 25 and the carrier 54 of the planetary gear mechanism 50 is set to substantially infinite. Even if the engine 22 and the like connected to the drive gear 25 is operated, for example, at any rotation speed capable of increasing efficiency, the rotation of the carrier 54 and the carrier shaft 55 can be stopped. In a state where the speed ratio α is substantially infinite, when the change speed state of the CVT 40, namely, the speed ratio γ is changed, the carrier 54 and the carrier shaft 55 can be rotated forwardly or reversely. Particularly, when the rotation speed of the carrier shaft 55, namely, the vehicle speed V is low, the torque from at least one of the engine 22, the motors MG1 and MG2 can be amplified and high torque can be efficiently outputted to the carrier shaft 55 as the drive shaft. Further, in a state where the clutch C1 connects the primary shaft 41 of the CVT 40 and the motor MG1, when the clutch C2 disconnects the motor MG1 from the drive gear shaft 26, the motor MG1 can rotate the primary shaft 41 of the CVT 40 independently of the rotation of the drive gear 25. In this state, the rotation of the motor MG1 connected to the primary shaft 41 of the CVT 40 is controlled, and further, the speed ratio γ of the CVT 40 is changed as needed. By doing so, the speed ratio α between the drive gear 25, namely, the engine 22 and the motors MG1 and MG2, and the carrier 54 which is the output element of the planetary gear mechanism 50, namely, the carrier shaft 55 as the drive shaft can be further decreased (larger speed increasing ratio). Further, the hybrid vehicle 20 of the present embodiment includes the brake B1 to non-rotatably fix the sun gear 51 which is the first input element of the planetary gear mechanism 50 via the secondary shaft 42 of the CVT 40. Therefore, in a state where the clutch C1 connects the primary shaft 41 of the CVT 40 and the motor MG1 and the clutch C2 disconnects the motor MG1 from the drive gear shaft 26 (drive gear 25), when the rotation of the secondary shaft 42 of the CVT 40 is stopped, the brake B1 can non-rotatably fix the sun gear 51 of the planetary gear mechanism 50. In the state where the rotation of the sun gear 51 of the planetary gear mechanism 50 and the secondary shaft 42 is non-rotatably fixed in this manner, the power from the engine 22 and the like can be transmitted to the carrier shaft 55 as the drive shaft via the drive gear 25 and the planetary gear mechanism 50 without using the CVT 40. Further, in the state where the sun gear 51 of the planetary gear mechanism 50 is non-rotatably fixed as described above, when the clutch C2 connects the motor MG1 and the drive gear shaft 26, the power from at least both the engine 22 and the motor MG1 can be transmitted to the carrier shaft 55 as the drive shaft via the drive gear 25 and the planetary gear mechanism 50. Thereby, the power from the engine 22 and the motor MG1 can be efficiently transmitted to the carrier shaft 55 without a loss in the CVT 40, and the performances of the hybrid vehicle 20, particularly the acceleration performance in a high speed driving can be further improved. As a result, the hybrid vehicle 20 can further increase the speed ratio range between the engine 22 and the motors MG1 and MG2, and the carrier shaft 55 as the drive shaft, and can improve the energy efficiency and the torque characteristics in an extremely wide driving area ranging from a low speed area in which the rotation speed of the carrier shaft 55 is low to a high speed area in which the rotation speed thereof is increased.

Specifically, according to the above hybrid vehicle 20, when the carrier 54 which is the output element of the planetary gear mechanism 50 rotates in the direction opposite to the rotational direction of the drive gear 25, the carrier shaft 55 as the drive shaft rotates forwardly. Thus, when the carrier shaft 55 rotates forwardly, both the ring gear 52 (second input element) of the planetary gear mechanism 50 and the carrier 54 (output element) rotate in the direction opposite to the rotational direction of the drive gear 25. Accordingly, according to the hybrid vehicle 20, in a state where the speed ratio α between the drive gear 25 and the carrier 54 (carrier shaft 55) of the planetary gear mechanism 50 is set to substantially infinite, when the speed ratio γ of the CVT 40 is made smaller than the gear ratio ρ of the planetary gear mechanism 50 (the change speed state of the CVT 40 is changed to the acceleration side), the rotation speed Ns of the sun gear 51 of the planetary gear mechanism 50 connected to the secondary shaft 42 of the CVT 40 increases. Thereby, high torque can be outputted to the carrier 54 of the planetary gear mechanism 50 to rotate the carrier 54 in the same direction as the rotational direction of the drive gear 25, that is, high torque can be outputted to the carrier shaft 55 as the drive shaft to reversely rotate the carrier shaft 55 to run the hybrid vehicle 20 in the reverse direction (reverse driving mode, reverse motor driving mode). Alternatively, in a state where the speed ratio α between the drive gear 25 and the carrier 54 of the planetary gear mechanism 50 is set to substantially infinite, when the speed ratio γ of the CVT 40 is made larger than the gear ratio ρ of the planetary gear mechanism 50 (the change speed state of the CVT 40 is changed to the deceleration side), the rotation speed Ns of the sun gear 51 of the planetary gear mechanism 50 connected to the secondary shaft 42 of the CVT 40 decreases. Thereby, high torque can be outputted to the carrier 54 of the planetary gear mechanism 50 to increase the rotation speed Nc of the carrier 54 in the direction opposite to the rotational direction of the drive gear 25, that is, high torque can be outputted to the carrier shaft 55 as the drive shaft to rotate the carrier shaft 55 to the forward rotation side and run the hybrid vehicle 20 in the advancing direction while increasing rotation speed (vehicle speed V) (low speed forward driving mode, low speed forward motor driving mode). Further, in a state where the clutch C2 disconnects the motor MG1 from the drive gear shaft 26, when the rotation speed Nm1 of the motor MG1 connected to the primary shaft 41 of the CVT 40 by the clutch C1 decreases and the motor MG1 is temporarily stopped (middle speed transition mode), the rotation speed Ns of the sun gear 51 of the planetary gear mechanism 50 connected to the secondary shaft 42 of the CVT 40 can be set to a value of 0. In this state, when the brake B1 non-rotatably fixes the sun gear 51 (secondary shaft 42 of the CVT 40) of the planetary gear mechanism 50, the torque from at least one of the engine 22 and the motor MG2 can be transmitted to the carrier shaft 55 as the drive shaft via the drive gear 25 and the planetary gear mechanism 50 without using the CVT 40 (cruising mode, cruising motor driving mode). Alternatively, in a state where the brake B1 non-rotatably fixes the sun gear 51 (secondary shaft 42 of the CVT 40) of the planetary gear mechanism 50, when the clutch C2 connects the motor MG1 and the drive gear shaft 26, the power from all the engine 22 and the motors MG1 and MG2 or from both the motors MG1 and MG2 can be transmitted to the carrier shaft 55 as the drive shaft via the drive gear 25 and the planetary gear mechanism 50 (high output driving mode, high output motor driving mode). Further, in a state where the clutch C2 disconnects the motor MG1 from the drive gear shaft 26, when the rotation speed Nm1 (rotation speed Ns of the sun gear 51 of the planetary gear mechanism 50) of the motor MG1 connected to the primary shaft 41 of the CVT 40 by the clutch C1 reaches a value of 0, if the rotation speed Nm1 (rotation speed Ni) of the motor MG1 is increased in the direction opposite to the rotational direction thereof (in the same direction as the rotational direction of the ring gear 52), the sun gear 51 of the planetary gear mechanism 50 connected to the secondary shaft 42 of the CVT 40 can rotate in the direction opposite to the rotational direction of the drive gear 25, that is, in the same direction as the rotational direction of the ring gear 52 and the carrier 54, and the rotation speed Ns thereof can be increased. At this time, if the speed ratio γ of the CVT 40 is further decreased (the change speed state of the CVT 40 is changed to the acceleration side), the rotation speed Ns of the sun gear 51 can be further increased. The further increased the rotation speed of the sun gear 51 of the planetary gear mechanism 50 in the direction opposite to the rotational direction of the drive gear 25, the further decreased (larger speed increasing ratio) the speed ratio α between the drive gear 25 and the carrier 54 which is the output element of the planetary gear mechanism 50, namely, the carrier shaft 55 as the drive shaft. Thus, the rotation speed in the forward rotation side of the carrier shaft 55 as the drive shaft, namely, the vehicle speed V can be further increased (high speed driving mode, high speed motor driving mode).

As described above, when the carrier 54 of the planetary gear mechanism 50 rotates in the direction opposite to the rotational direction of the drive gear 25, the carrier shaft 55 as the drive shaft rotates forwardly and the hybrid vehicle 20 advances forward. Here, continuously changing the rotation speed Ns of the sun gear 51 of the planetary gear mechanism 50 within the range including a value of 0 can prevent an excessive rotation speed of the individual elements (especially, the sun gear 51) of the planetary gear mechanism 50 and enables forward rotation and reverse rotation of the carrier shaft 55 as the drive shaft, that is, forward advancing and backward advancing of the hybrid vehicle 20. Further, the speed ratio range between the engine 22 and the motors MG1 and MG2 and the carrier shaft 55 can be increased to improve the energy efficiency and the torque characteristics in a wider driving area in the forward rotation side of the carrier shaft 55 as the drive shaft, that is, in the forward advancing direction of the hybrid vehicle 20. Therefore, like the above embodiments, when the torque demand is set based on the accelerator opening Acc and the vehicle speed V, in the reverse driving mode (reverse motor driving mode) and the low speed forward driving mode (low speed forward motor driving mode) in which the clutches C1 to C4 connect the drive gear shaft 26 (drive gear 25) to between the motor MG2 and the engine 22 and to between the motor MG1 and the CVT 40, the engine 22, the motors MG1 and MG2, and the CVT 40 may be controlled so that the torque based on torque demand may be outputted to the carrier shaft 55 as the drive shaft. Further, in the middle speed transition mode or the high speed driving mode (high speed motor driving mode) where the clutch C2 disconnects the motor MG1 from the drive gear shaft 26, the engine 22, the motors MG1 and MG2, and the CVT 40 may be controlled so that the motor MG1 decelerates or the motor MG1 rotates in the direction opposite to the rotational direction of the drive gear 25 and the torque based on torque demand is outputted to the carrier shaft 55 as the drive shaft. Further, in the cruising mode (cruising motor driving mode) where the clutch C2 disconnects the motor MG1 from the drive gear shaft 26 and the brake B1 non-rotatably fixes the first input element of the planetary gear mechanism 50, at least one of the engine 22 and the motor MG2 may be controlled so that the torque based on torque demand is outputted to the carrier shaft 55 as the drive shaft. Further, in the high output driving mode (high output motor driving mode) where the clutch C1 disconnects the primary shaft 41 of the CVT 40 from the motor MG1, the clutch C2 connects the motor MG1 and the drive gear shaft 26, and the brake B1 non-rotatably fixes the sun gear 51 (secondary shaft 42 of the CVT 40) of the planetary gear mechanism 50, the engine 22, and the motors MG1 and MG2 may be controlled so that the torque based on torque demand is outputted to the carrier shaft 55 as the drive shaft.

In addition, the hybrid vehicle 20 of the present embodiment includes the clutch C3 which performs a connection and releases the connection between the drive gear shaft 26 (drive gear 25) and the motor MG2 (engine 22). Thus, in a state where the clutches C1 and C2 connect the primary shaft 41 of the CVT 40 and the motor MG1 and the drive gear shaft 26 (drive gear 25), when the clutch C3 releases the connection between the drive gear shaft 26 and the motor MG2, the power only from the motor MG1 is split from the drive gear 25 and the CVT 40 to be outputted to the planetary gear mechanism 50, and can be transmitted to the carrier shaft 55 as the drive shaft. Further, in a state where the clutch C1 releases the connection between the primary shaft 41 of the CVT 40 and the motor MG1, the clutch C2 connects the motor MG1 and the drive gear shaft 26 (drive gear 25), the brake B1 non-rotatably fixes the sun gear 51 (secondary shaft 42 of the CVT 40) of the planetary gear mechanism 50, and the clutch C3 releases the connection between the drive gear shaft 26 and the motor MG2, the power only from the motor MG1 can be transmitted to the carrier shaft 55 as the drive shaft via the drive gear 25 and planetary gear mechanism 50.

In addition, the hybrid vehicle 20 of the present embodiment including a so-called 2-motor 1-engine type power output apparatus includes the clutch C4 which performs a connection and releases the connection between the motor MG2 and the engine 22. Since the clutch C4 can disconnects the motor MG2 from the engine 22, when the engine 22 stops operating, the corotation of the engine 22 can be avoided. If the single pinion planetary gear mechanism including the sun gear 51 as the first input element, the ring gear 52 as the second input element, and the carrier 54 as the output element holding the pinion gear 53 which meshes with both the sun gear 51 and the ring gear 52 is used as the planetary gear mechanism 50, the number of components can be suppressed from increasing and the hybrid vehicle 20 can be made compact. Since the hybrid vehicle 20 of the above present embodiments can prevent the load of one of the motors MG1 and MG2 from being more excessive than the other thereof, the motor MG1 and the motor MG2 having the same specifications (same size) can be used, thereby improving the productivity of the hybrid vehicle 20.

Figure 19:
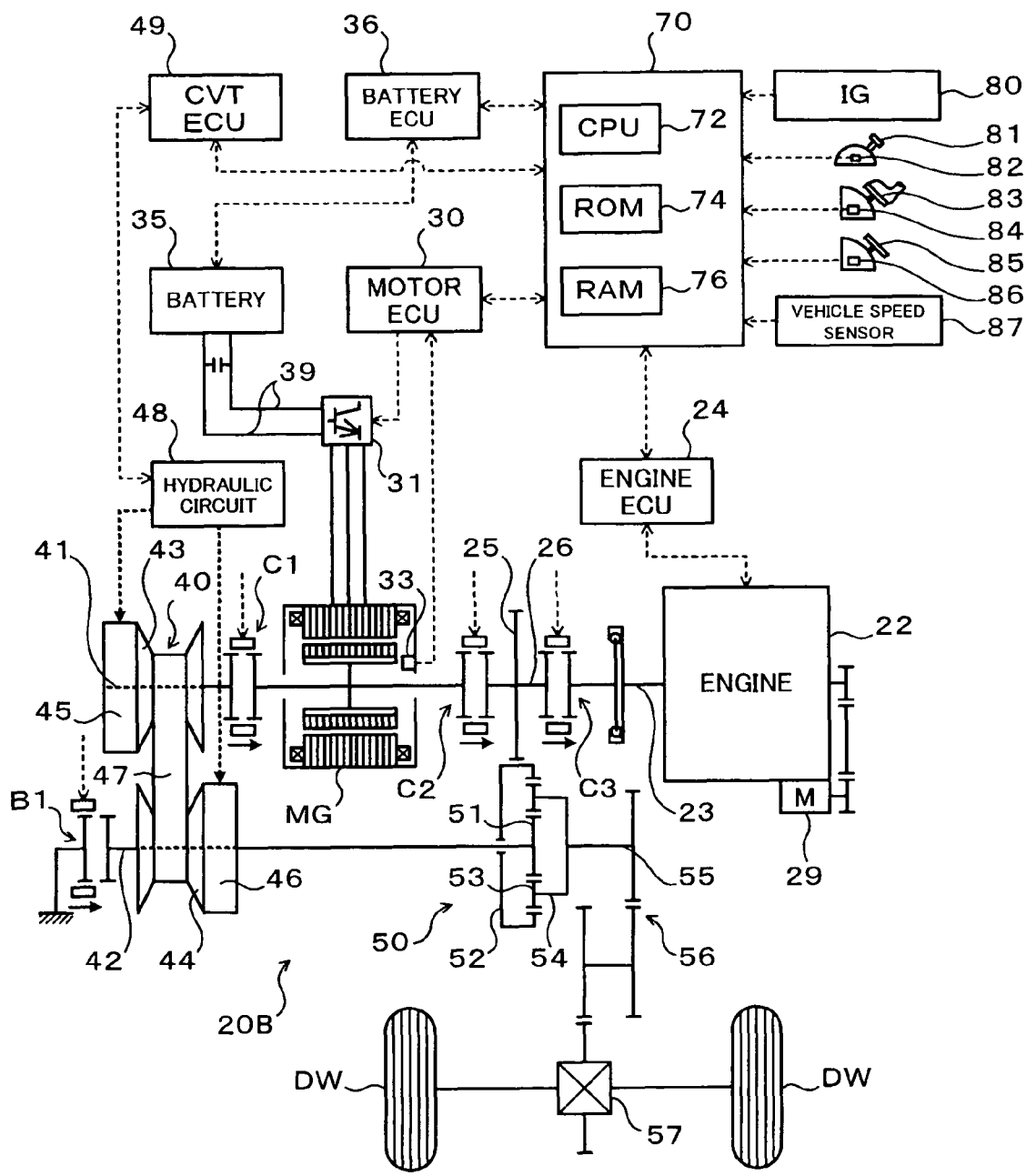
FIG. 19 is a schematic block diagram of the hybrid vehicle in accordance with a variation of the present embodiment.

FIG. 19 is a schematic block diagram of a hybrid vehicle 20B which is a vehicle in accordance with a variation of the present invention. The hybrid vehicle 20B shown in the same figure includes an engine 22 as a power generation source; an single motor MG; a battery 35 capable of supplying and receiving electric power to and from the motor MG; a drive gear (rotational element) 25, a belt-type continuously variable transmission unit (hereinafter referred to as "CVT") 40, a three-element planetary gear mechanism 50 constituting a so-called infinitely variable transmission; and a hybrid electronic control unit (hereinafter referred to as "hybrid ECU") 70 for controlling the entire hybrid vehicle 20 and the like. Specifically, the hybrid vehicle 20B replaces the motor MG1 of the hybrid vehicle 20 shown in FIG. 1 with the motor MG and omits the motor MG2 and the clutch C4 from the hybrid vehicle 20. According to the hybrid vehicle 20B, the clutch C3 performs a connection and releases the connection between the drive gear shaft 26 (drive gear 25) and the crankshaft 23 of the engine 22. Further, the hybrid vehicle 20B includes a starter motor 29 connected to the crankshaft 23 of the engine 22 via a gear train and controlled by the engine ECU 24. Such configured 1-motor 1-engine type hybrid vehicle 20B can also provide the same driving modes as the reverse driving mode (reverse motor driving mode), the low speed forward driving mode (low speed forward motor driving mode), the middle speed transition mode, the cruising mode (cruising motor driving mode), the high speed driving mode, and the high output driving mode of the above described hybrid vehicle 20.

Figure 20:
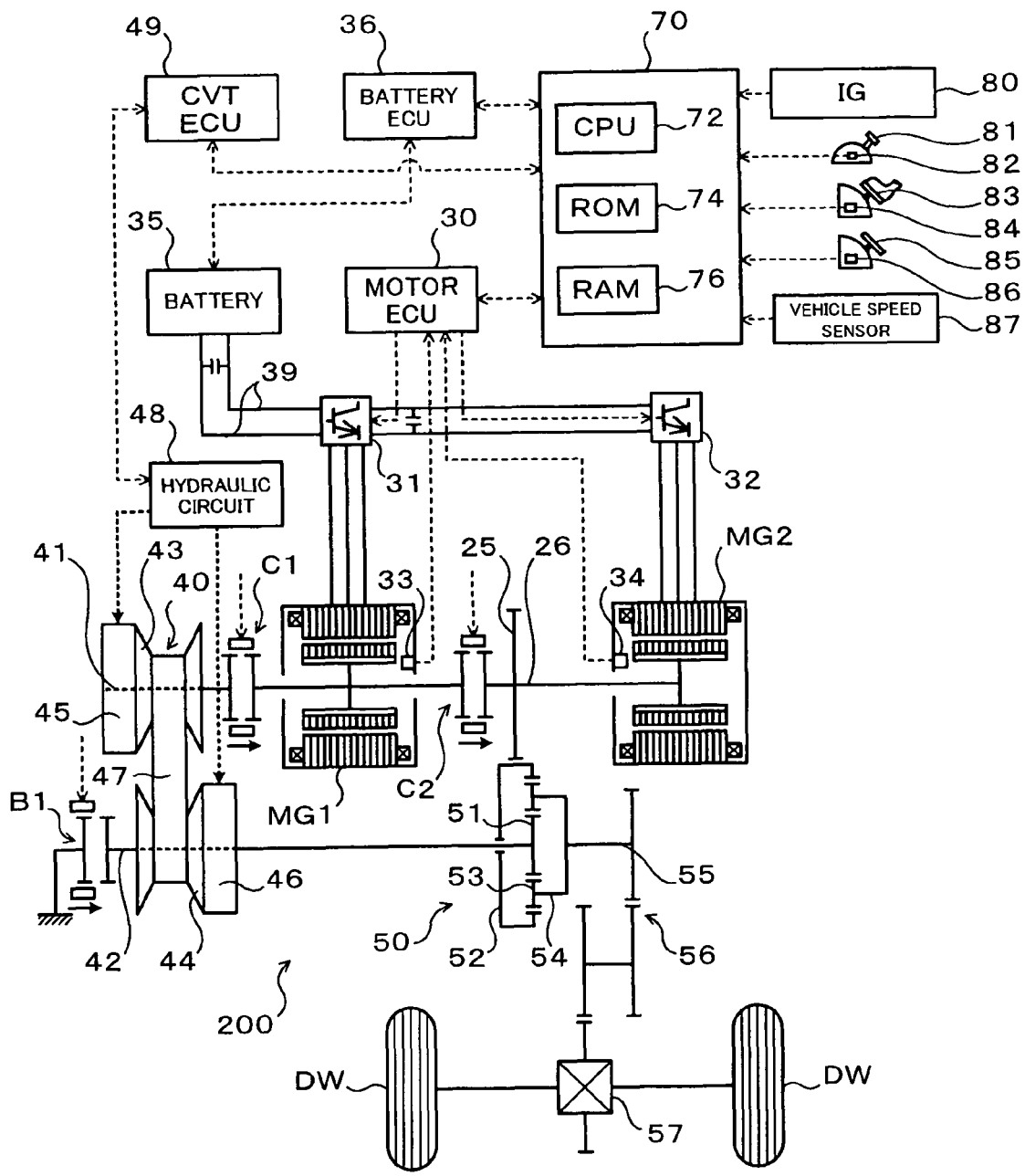
FIG. 20 is a schematic block diagram of an electric vehicle according to a variant.

FIG. 20 is a schematic block diagram of an electric vehicle 200 which is a vehicle in accordance with a variation of the present invention. The electric vehicle 200 shown in the same figure omits the engine 22 and the clutches C3 and C4 from the above described hybrid vehicle 20, and directly connects the motor MG2 to the drive gear shaft 26 (drive gear 25). Such configured 2-motor electric vehicle 200 can also provide the same driving modes as the reverse motor driving mode, the low speed forward motor driving mode, the middle speed transition mode, the cruising motor driving mode, the high speed motor driving mode and the high output motor driving mode of the above described hybrid vehicle 20. Alternatively, the electric vehicle 200 may include a clutch that performs a connection and releases the connection between the drive gear shaft 26 (drive gear 25) and the motor MG2.

It should be noted that the above hybrid vehicles 20 and 20B, and the electric vehicle 200 may omit the brake B1. Further, the above hybrid vehicle 20 of the present embodiment has been described such that the motor MG2 cranks and starts the engine 22, but the hybrid vehicles 20 may, of course, include a starter (starter motor) for starting the engine 22. Alternatively, the hybrid vehicles 20 and 20B and the electric vehicle 200 may be configured as vehicles of the type in which the entire cabin including a driver seat is rotated. The above embodiments and variations have been described such that the power output apparatus is mounted on the hybrid vehicle 20 and the like, the power output apparatus in accordance with the present invention may be mounted on a vehicle other than a car, and a mobile body such as vessel and aircraft, and may also be installed in fixed equipment such as construction equipment.

Here, a description will be given to the correspondence between the major components of the above embodiments and the variations and the major components of the present invention described in the SUMMARY OF THE INVENTION. Specifically, in the above embodiments and the variations, the engine 22 as "internal combustion engine" capable of outputting power to the drive gear 25 and the motor MG2 as "second electric motor" correspond to "power generation source"; the motors MG and MG1 correspond to "electric motor"; the battery 35 corresponds to "accumulator"; the CVT 40 capable of steplessly changing the speed of power inputted to the primary shaft 41 and outputting the power to the secondary shaft 42 corresponds to "continuously variable transmission device"; the planetary gear mechanism 50 including the sun gear 51 connected to the secondary shaft 42 of the CVT 40, the ring gear 52 capable of rotating in a direction opposite to a rotational direction of the drive gear 25 in conjunction with the drive gear 25, and the carrier 54 connected to the carrier shaft 55 as the drive shaft corresponds to "planetary gear mechanism"; the clutch C1 that performs a connection and releases the connection between the primary shaft 41 of the CVT 40 and the motor MG1 corresponds to "first connection and disconnection device"; the clutch C2 that performs a connection and releases the connection between the motor MG1 and the drive gear shaft 26 corresponds to "second connection and disconnection device"; and the brake B1 capable of non-rotatably fixing the sun gear 51 of the planetary gear mechanism 50 corresponds to "element fixing device". Further, a combination of the hybrid ECU 70, the engine 22, the motor ECU 30, the CVT ECU 49 corresponds to "control module"; the clutch C3 that performs a connection and releases the connection between the drive gear shaft 26 and the motor MG2 corresponds to "third connection and disconnection device"; the motor MG2 corresponds to "second electric motor"; and the clutch C4 that performs a connection and releases the connection between the motor MG2 and the crankshaft 23 of the engine 22 corresponds to "fourth connection and disconnection device".

It should be noted that the "internal combustion engine" is not limited to the engine 22 that receives a supply of hydrocarbon fuels such as gasoline or gas oil and outputs power, but may be of any other type such as a hydrogen engine. The "continuously variable transmission device" is not limited to the belt-type CVT 40, but may be of any other type such as a toroidal-type continuously variable transmission and an electric continuously variable transmission device made up of a pair-rotor motor as long as it can steplessly change the speed of power inputted to an input shaft and output the power to an output shaft. The "planetary gear mechanism" may be of any type other than the single pinion planetary gear mechanism 50 as long as it includes a first input element connected to an output shaft of the continuously variable transmission device, a second input element that can rotate in the direction opposite to the rotational direction of a rotational element in conjunction with the rotational element, and an output element connected to a drive shaft. The "first, second, third, and fourth connection and disconnection devices" and the "element fixing device" may be of any type such as friction clutches other than the clutches C1 to C4 that are dog clutches and the brake B1 as long as they can perform a connection between the corresponding elements and can release the connection therebetween. The "electric motor" and the "second electric motor" are not limited to the synchronous motor generators such as motors MG, MG1, and MG2, but may be of any other type such as an induction motor. The "accumulator" is not limited to the secondary battery such as the battery 35, but may be of any other type such as a capacitor as long as it can supply and receive electric power to and from the electric motors. The "control module" may be of any type other than the combination of the hybrid ECU 70, the engine ECU 24, the motor ECU 30, and the CVT ECU 49. In any case, the correspondence between the major components in the embodiments and the variation and the major components of the invention described in SUMMARY OF THE INVENTION do not limit the components of the invention described in SUMMARY OF THE INVENTION since the embodiments are examples for specifically describing the best mode for carrying out the invention described in SUMMARY OF THE INVENTION. In other words, the embodiments are merely examples of the invention described in SUMMARY OF THE INVENTION, and the invention described in SUMMARY OF THE INVENTION should be construed on the basis of the description therein.

Hereinbefore, the embodiments of the present invention have been described with reference to drawings, but the present invention is not limited to the above embodiments. It will be apparent that various modifications can be made to the present invention without departing from the spirit and scope of the present invention.

The present invention can be used in a manufacturing industry or the like of a power output apparatus and a vehicle.

The disclosure of Japanese Patent Application No. 2008-099531 filed Apr. 7, 2008 including specification, drawings and claims is incorporated herein by reference in its entirety.

What is claimed is:

1. A power output apparatus that outputs power to a drive shaft, said power output apparatus comprising:
    a power generation source capable of outputting power to a predetermined rotational element;
    an electric motor capable of outputting power;
    an accumulator capable of supplying and receiving electric power to and from said electric motor;
    a continuously variable transmission device capable of steplessly changing the speed of power inputted to an input shaft and outputting the power to an output shaft;
    a planetary gear mechanism that includes: a first input element connected to said output shaft of said continuously variable transmission device; a second input element rotatable in a direction opposite to a rotational direction of said rotational element in conjunction with said rotational element; and an output element connected to said drive shaft;
    a first connection and disconnection device that performs a connection and releases the connection between said input shaft of said continuously variable transmission device and a rotating shaft of said electric motor;
    a second connection and disconnection device that performs a connection and releases the connection between the rotating shaft of said electric motor and said rotational element; and
    an element fixing device capable of non-rotatably fixing said first input element of said planetary gear mechanism.

2. A power output apparatus according to claim 1, wherein said drive shaft rotates forwardly when said output element of said planetary gear mechanism rotates in the direction opposite to the rotational direction of said rotational element.

3. A power output apparatus according to claim 2, further comprising a control module that controls at least one of said power generation source and said electric motor so that power based on driving power demand required for said drive shaft is outputted to said drive shaft when said first connection and disconnection device releases a connection between said input shaft of said continuously variable transmission device and the rotating shaft of said electric motor, said second connection and disconnection device connects the rotating shaft of said electric motor and said rotational element, and said element fixing device non-rotatably fixes said first input element of said planetary gear mechanism.

4. A power output apparatus according to claim 3, wherein said control module controls said power generation source so that the power based on said driving power demand is outputted to said drive shaft when said second connection and disconnection device releases the connection between the rotating shaft of said electric motor and said rotational element, and said element fixing device non-rotatably fixes said first input element of said planetary gear mechanism.

5. A power output apparatus according to claim 3, wherein said control module controls said power generation source, said electric motor, and said continuously variable transmission device so that the power based on said driving power demand is outputted to said drive shaft when said first and second connection and disconnection devices connect said input shaft of said continuously variable transmission device, the rotating shaft of said electric motor, and said rotational element, as well as said control module controls said power generation source, said electric motor, and said continuously variable transmission device so that said electric motor decelerates or said electric motor rotates in the direction opposite to the rotational direction of said rotational element, and the power based on said driving power demand is outputted to said drive shaft, when said first connection and disconnection device connects the rotating shaft of said electric motor and said input shaft of said continuously variable transmission device, and said second connection and disconnection device releases the connection between the rotating shaft of said electric motor and said rotational element.

6. A power output apparatus according to claim 3, further comprising a third connection and disconnection device that performs a connection and releases the connection between said rotational element and said power generation source.

7. A power output apparatus according to claim 6, wherein said control module controls said electric motor and said continuously variable transmission device so that the power based on said driving power demand is outputted to said drive shaft when said first and second connection and disconnection devices connect said input shaft of said continuously variable transmission device, the rotating shaft of said electric motor, and said rotational element, and said third connection and disconnection device releases the connection between said rotational element and said power generation source, as well as said control module controls said electric motor so that the power based on said driving power demand is outputted to said drive shaft when said first connection and disconnection device releases the connection between the rotating shaft of said electric motor and said input shaft of said continuously variable transmission device, said second connection and disconnection device connects the rotating shaft of said electric motor and said rotational element, said element fixing device non-rotatably fixes said first input element of said planetary gear mechanism, and said third connection and disconnection device releases the connection between said rotational element and said power generation source.

8. A power output apparatus according to claim 1, wherein said power generation source is a second electric motor different from said electric motor.

9. A power output apparatus according to claim 1, wherein said power generation source is an internal combustion engine.

10. A power output apparatus according to claim 1, wherein said power generation source includes a second electric motor different from said electric motor, and an internal combustion engine.

11. A power output apparatus according to claim 10, further comprising a fourth connection and disconnection device that performs a connection and releases the connection between said second electric motor and said internal combustion engine.

12. A vehicle having drive wheels connected to a drive shaft, said vehicle comprising:
    a power generation source capable of outputting power to a predetermined rotational element;
    an electric motor capable of outputting power;
    an accumulator capable of supplying and receiving electric power to and from said electric motor;
    a continuously variable transmission device capable of steplessly changing the speed of power inputted to an input shaft and outputting the power to an output shaft;
    a planetary gear mechanism that includes: a first input element connected to said output shaft of said continuously variable transmission device; a second input element rotatable in a direction opposite to a rotational direction of said rotational element in conjunction with said rotational element; and an output element connected to said drive shaft;
    a first connection and disconnection device that performs a connection and releases the connection between said input shaft of said continuously variable transmission device and a rotating shaft of said electric motor;
    a second connection and disconnection device that performs a connection and releases the connection between the rotating shaft of said electric motor and said rotational element; and
    an element fixing device capable of non-rotatably fixing said first input element of said planetary gear mechanism.

* * * * *